(12) United States Patent
Nishimoto et al.

(10) Patent No.: US 8,224,177 B2
(45) Date of Patent: Jul. 17, 2012

(54) DIGITAL CAMERA WITH SHUTTER CONTROL SECTION OR MIRROR CONTROL SECTION

(75) Inventors: Hitoshi Nishimoto, Yokohama (JP);
Yoshiaki Tanabe, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/064,724

(22) Filed: Apr. 11, 2011

(65) Prior Publication Data

US 2011/0194020 A1    Aug. 11, 2011

Related U.S. Application Data

(63) Continuation of application No. 12/068,231, filed on Feb. 4, 2008, now abandoned.

(30) Foreign Application Priority Data

Feb. 6, 2007   (JP) .................................. 2007-026807
Jun. 4, 2007   (JP) .................................. 2007-148270

(51) Int. Cl.
  *G03B 7/26*   (2006.01)
(52) U.S. Cl. ........................................ 396/280; 348/335
(58) Field of Classification Search .................... 396/280
   See application file for complete search history.

(56) References Cited

U.S. PATENT DOCUMENTS

| | | | |
|---|---|---|---|
| 6,543,078 B1 | 4/2003 | Ernst et al. | |
| 7,250,972 B2 | 7/2007 | Oshima | |
| 7,580,628 B2 | 8/2009 | Ide et al. | |
| 7,726,889 B2 | 6/2010 | Tenmyo | |
| 2001/0055072 A1 | 12/2001 | Mogamiya et al. | |
| 2006/0207290 A1 | 9/2006 | Ide et al. | |

FOREIGN PATENT DOCUMENTS

| | | |
|---|---|---|
| JP | 9-138458 | 5/1997 |
| JP | 11-305331 | 11/1999 |
| JP | 2002-229110 | 8/2002 |
| JP | 2002-300442 | 10/2002 |
| JP | 2003-57530 | 2/2003 |
| JP | 2006-010725 | 1/2006 |
| JP | 2006-47662 | 2/2006 |

OTHER PUBLICATIONS

U.S. Office Action for U.S. Appl. No. 12/068,231; Mailed Mar. 25, 2010.
U.S. Office Action for U.S. Appl. No. 12/068,231; Mailed Nov. 10, 2010.
Japanese Office Action mailed Oct. 25, 2011 in corresponding Japanese Patent Application No. 2007-148270.

*Primary Examiner* — Clayton E Laballe
*Assistant Examiner* — Bret Adams
(74) *Attorney, Agent, or Firm* — Staas & Halsey LLP

(57) ABSTRACT

A digital camera includes: a light guide section that defines a space in which a light flux from a photographic lens to an imaging unit is guided; a mirror unit arranged inside the light guide section, that is adapted to rotate between a viewing position in which the mirror unit is inserted in a photographic light path from the photographic lens to the imaging unit to reflect the light flux and a photographing position in which the mirror unit is retracted from the photographic light path; a mirror unit control section that controls rotation of the mirror unit; a rotation instruction section that outputs a signal to rotate the mirror unit while no photography is performed to the mirror unit control section; and an opening section provided in the light guide section that discharges from the light guide section air that is moved by the rotation of the mirror unit.

13 Claims, 20 Drawing Sheets

DIGITAL CAMERA WITH SHUTTER CONTROL SECTION OR MIRROR CONTROL SECTION

CROSS-REFERENCE TO RELATED APPLICATIONS

This application is a continuation of U.S. patent application Ser. No. 12/068,231 filed Jul. Feb. 4, 2008, now abandoned and claims the benefit of Japanese Application No.2007-026807, filed Feb. 6, 2007, and Japanese Application No. 2007-148270, filed Jun. 4, 2007, the disclosures of all of which are incorporated herein by reference. Also, the disclosure of the following application is herein incorporated by reference: Japanese Patent Application No. 2001-102253 filed Mar. 30, 2001.

BACKGROUND

1. Field

The present invention relates to a digital camera and to an interchangeable lens 2.

2. Description of the Related Art

Japanese Laid-open Patent Publication No. 2002-300442 discloses a camera in which an illumination means such as an LED provided below a mirror box illuminates an imaging unit through an opening provided on the lower surface of the mirror box to detect dust (foreign matter) adherent to an optical filter.

The construction described in the above-mentioned publication is simply contemplated to detect the dust adherent to the imaging unit but can not remove the adherent dust.

SUMMARY

A digital camera according to a 1st aspect of the present invention includes: a light guide section that defines a space in which a light flux from a photographic lens to an imaging unit is guided; a mirror unit arranged inside the light guide section, that is adapted to rotate between a viewing position in which the mirror unit is inserted in a photographic light path from the photographic lens to the imaging unit to reflect the light flux and a photographing position in which the mirror unit is retracted from the photographic light path; a mirror unit control section that controls rotation of the mirror unit; a rotation instruction section that outputs a signal to rotate the mirror unit while no photography is performed to the mirror unit control section; and an opening section provided in the light guide section that discharges from the light guide section air that is moved by the rotation of the mirror unit.

According to a 2nd aspect of the present invention, in the digital camera according to the 1st aspect, it is preferable that the photographic lens is detachable from a camera body of the digital camera, and the rotation instruction section outputs the signal to the mirror unit control section when the photographic lens is attached to the camera body of the digital camera.

According to a 3rd aspect of the present invention in the digital camera according to the 1st aspect, the rotation instruction section may output the signal to the mirror unit control section when power of the digital camera is turned ON or turned OFF.

According to a 4th aspect of the present invention, in the digital camera according to the 1st aspect, an operation member that outputs a rotation command to rotate the mirror unit in response to an operation by a user may be further provided, the rotation instruction section may output the signal to the mirror unit control section in response to the command to rotate the mirror unit, and the rotation instruction section may output the signal to the mirror unit control section in response to the rotation command from the operation member.

According to a 5th aspect of the present invention, in the digital camera according to the 1st aspect, it is preferable to further include a shutter arranged between the mirror unit and the imaging unit, and a shutter control section that controls opening and closing operation of the shutter, and it is preferable that the shutter control section controls the shutter to be changed from a state in which the shutter is closed to a state in which the shutter is opened during a time between a time before the mirror unit starts rotation from the viewing position to the photographing position and a time before the mirror unit reaches the photographing position after the mirror unit has started rotation thereof from the viewing position to the photographing position.

According to a 6th aspect of the present invention, in the digital camera according to the 1st aspect, a shutter arranged between the mirror unit and the imaging unit; and a shutter control section that controls opening and closing operation of the shutter may be further included, and the shutter control section may control the shutter to be changed from a state in which the shutter is closed to a state in which the shutter is opened during a time between a time before the mirror unit starts rotation from the viewing position to the photographing position and a time before the mirror unit reaches the photographing position after the mirror unit has started rotation from the viewing position to the photographing position, and may control, after a predetermined time is reached from the state in which the shutter is opened, the shutter to be changed to a state in which the shutter is closed.

According to a 7th aspect of the present invention, in the digital camera according to the 1st aspect, a shutter arranged between the mirror unit and the imaging unit, and a shutter control section that controls opening and closing operation of the shutter may be further included, and the shutter control section may control the shutter to be changed from a state in which the shutter is closed to a state in which the shutter is opened during a time between a time before the mirror unit starts rotation from the viewing position to the photographing position and a time before the mirror unit reaches the photographing position after the mirror unit has started rotation from the viewing position to the photographing position, and may control the shutter to be changed again to a state in which the shutter is closed.

According to a 8th aspect of the present invention, in the digital camera according to the 1st aspect, a shutter arranged between the mirror unit and the imaging unit, and a shutter control section that controls opening and closing operation of the shutter may be further included, and the shutter control section may control the shutter to be changed from a state in which the shutter is closed to a state in which the shutter is opened during a time between a time before the mirror unit starts rotation from the viewing position to the photographing position and a time before the mirror unit reaches the photographing position after the mirror unit has started rotation from the viewing position to the photographing position, and thereafter may control the shutter to be changed again to a state in which the shutter is closed before a flow of air toward the imaging unit from a side of the photographic lens generated in the light guide section by rotation of the mirror unit from the viewing position to the photographing position reaches the shutter.

DETAILED DESCRIPTION

Referring to FIGS. 1 to 7, one embodiment of the present invention is explained.

Figure 1:
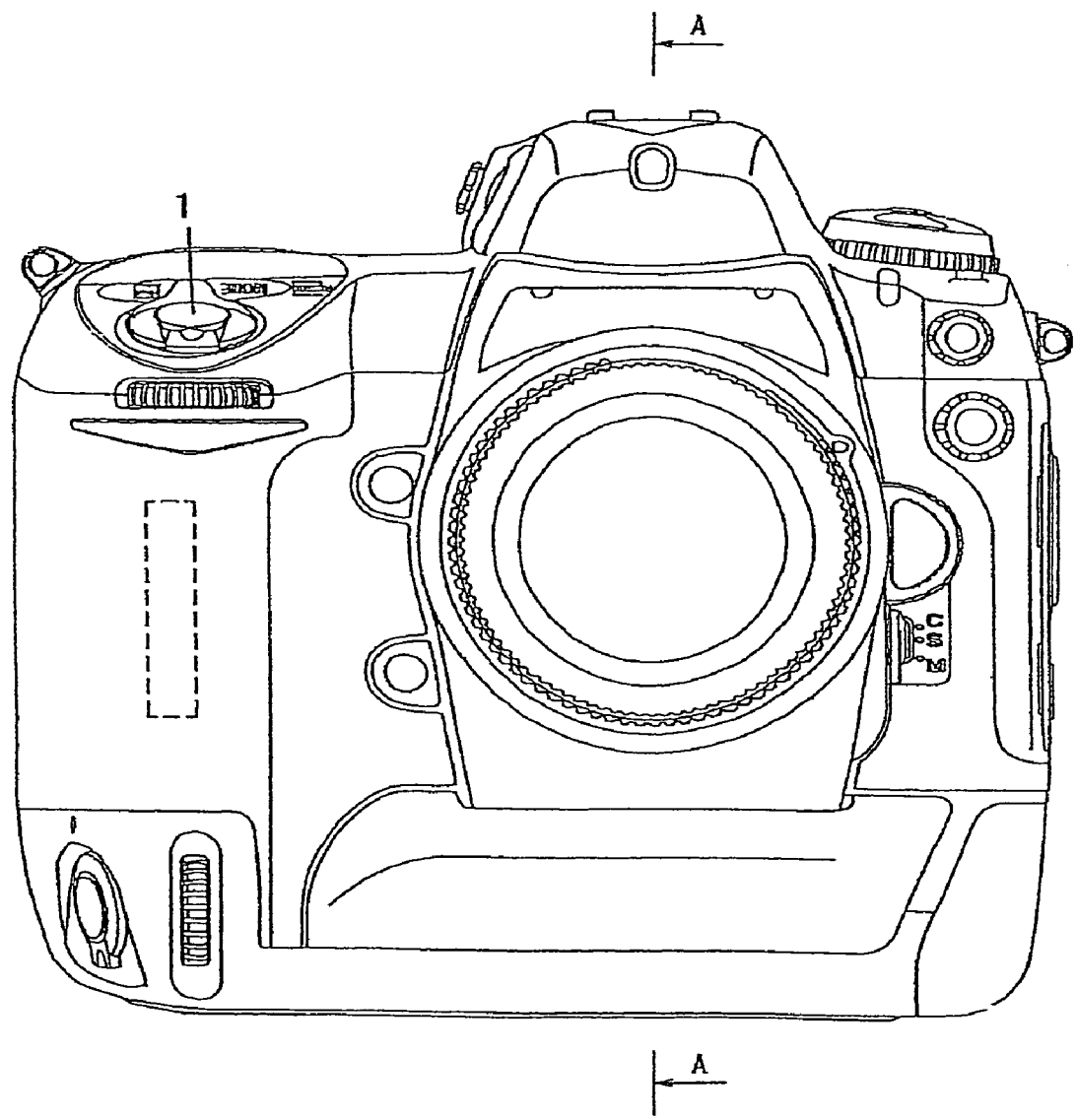
FIG. 1 is an elevational view showing a single-lens reflex digital camera according to an embodiment of the present invention.
Figure 2:
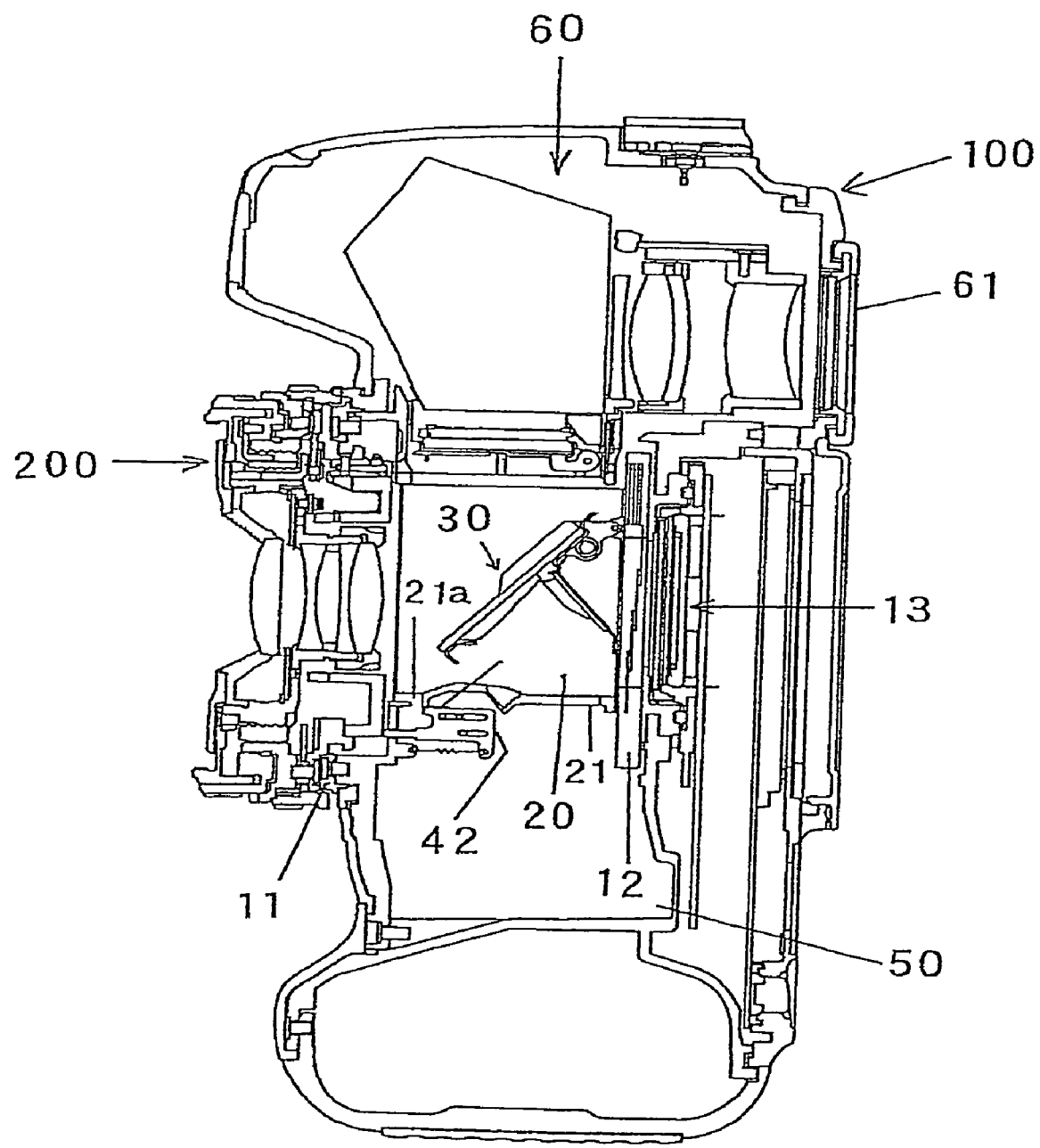
FIG. 2 is a cross-sectional view along the A-A line in FIG. 1.

FIG. 1 is an elevational view showing a single-lens reflex digital camera according to an embodiment of the present invention and FIG. 2 is a cross-sectional view along the A-A line in FIG. 1. A camera body 100 includes a lens mount 11 and behind the lens mount 11 a mirror box 20 that provides a photographic light path. Behind the mirror box 20 is arranged a shutter 12, and behind the shutter 12 is provided an imaging unit 13. Above the mirror box 20 is arranged a finder optical system 60.

On the lens mount 11 an interchangeable lens (photographic lens) 200 is to be mounted. A light flux from a photographic subject that passes through the interchangeable lens 200 is incident into the mirror box 20 through an opening of the lens mount 11. In the mirror box 20, there is arranged a mirror unit 30.

Figure 15:
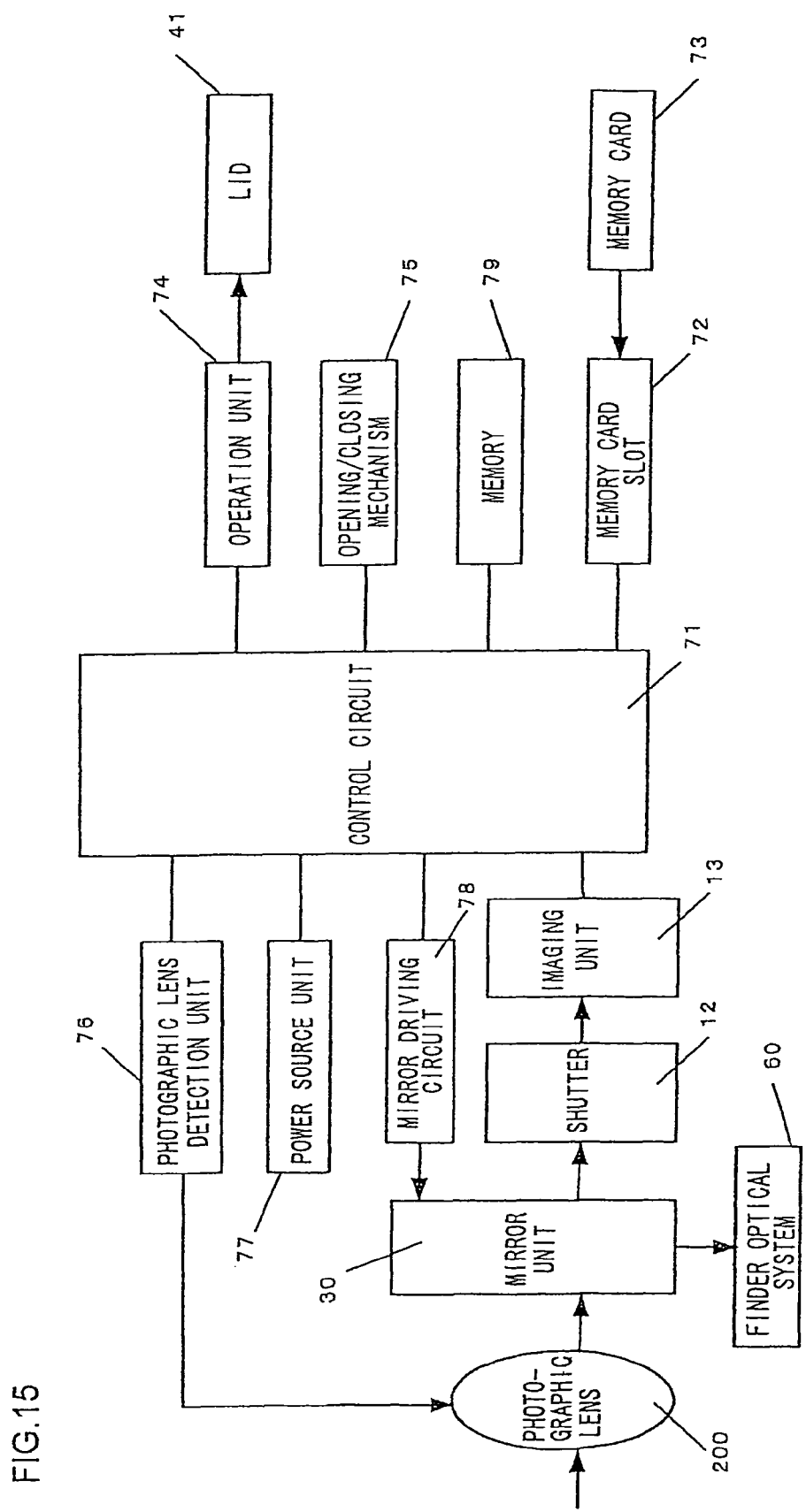
FIG. 15 is a block diagram illustrating control of the camera.

FIG. 15 is a schematic block diagram illustrating the construction of the digital camera of the present embodiment.

The light flux from the photographic subject input through the photographic lens 200, when the mirror unit 30 is in a viewing position as detailed hereinbelow, is reflected by the mirror unit 30 and incident into the finder optical system 60. On the other hand, when the mirror unit 30 is in a photographic position, the light flux is incident into the imaging unit 13, so that an image of the photographic subject is captured. The image unit 13 outputs an image signal, which is temporarily stored in a buffer memory not shown. Then, the image signal is sent to a control circuit 71, in which the image signal is subjected to well-known image processing such as white balance processing, color conversion processing or gradation correction processing. The image data obtained by the processing in the control circuit 71 is compressed by a well-known method such as a JPEG method and the compressed image data is recorded in a memory card 73 loaded in a memory card slot 72. The memory card 73 is detachably attached to the camera body 100. Note that the destination of recording of the image data may be the memory card 73 that is detachably attached to the camera body 100 or a memory 79 incorporated in the camera body 100.

An operation unit 74 includes various operation members to be operated by a user in order to operate the digital camera. The operation unit 74 includes, for example, a release button 1 and an operation member that instructs a dust removing operation detailed hereinbelow. A lid member 41 is a lid that opens and closes an air hole detailed hereinbelow. Opening and closing of the lid member 41 is controlled by the control circuit 71 through an opening/closing mechanism 75. Note that the opening/closing of the lid member 41 may be controlled not only by the control circuit 71 but also by a mechanical mechanism alone depending on whether or not the photographic lens 200 is loaded on the lens mount.

A photographic lens detection unit 76 detects whether the photographic lens 200 is attached to or detached from the camera body 100. A signal indicating whether the photographic lens 200 is attached to or detached from the camera body 100 detected by the photographic lens detection unit 76 may be sent to the control circuit 71 and a dust removal operation may be performed depending on whether the photographic lens 200 is attached or detached. Alternatively, a power source unit 77 may send a signal on ON/OFF of a power source to the control circuit 71 to make the dust removal operation be performed depending on ON/OFF of the power source of the digital camera. The mirror unit 30 is controlled by the control circuit 71 through a mirror drive circuit 78 and is driven not only when photographing but also when performing dust removal. The dust removal operation is detailed later on.

Figure 3:
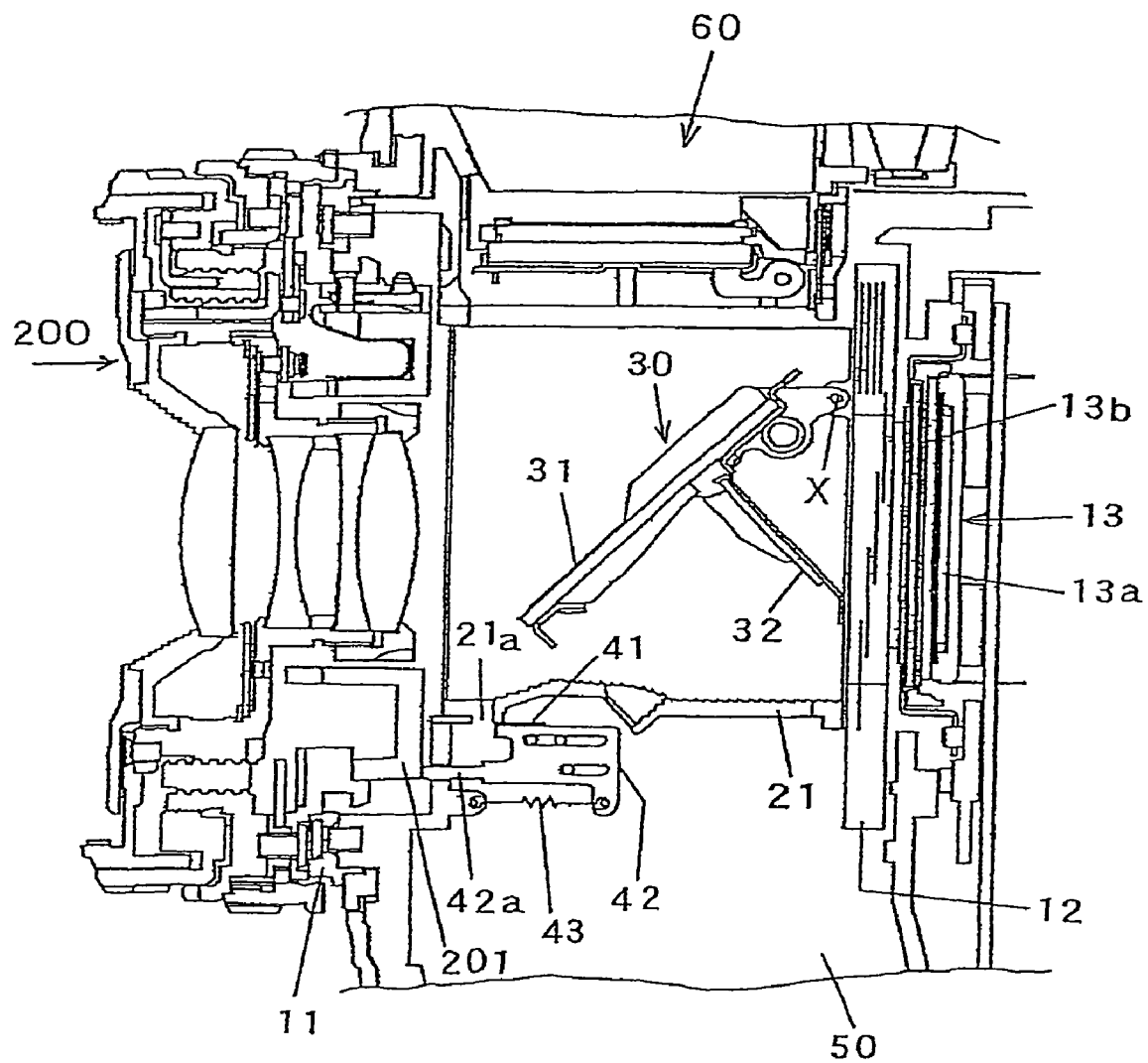
FIG. 3 is an enlarged view of the vicinity of a mirror box in FIG. 2.
Figure 4:
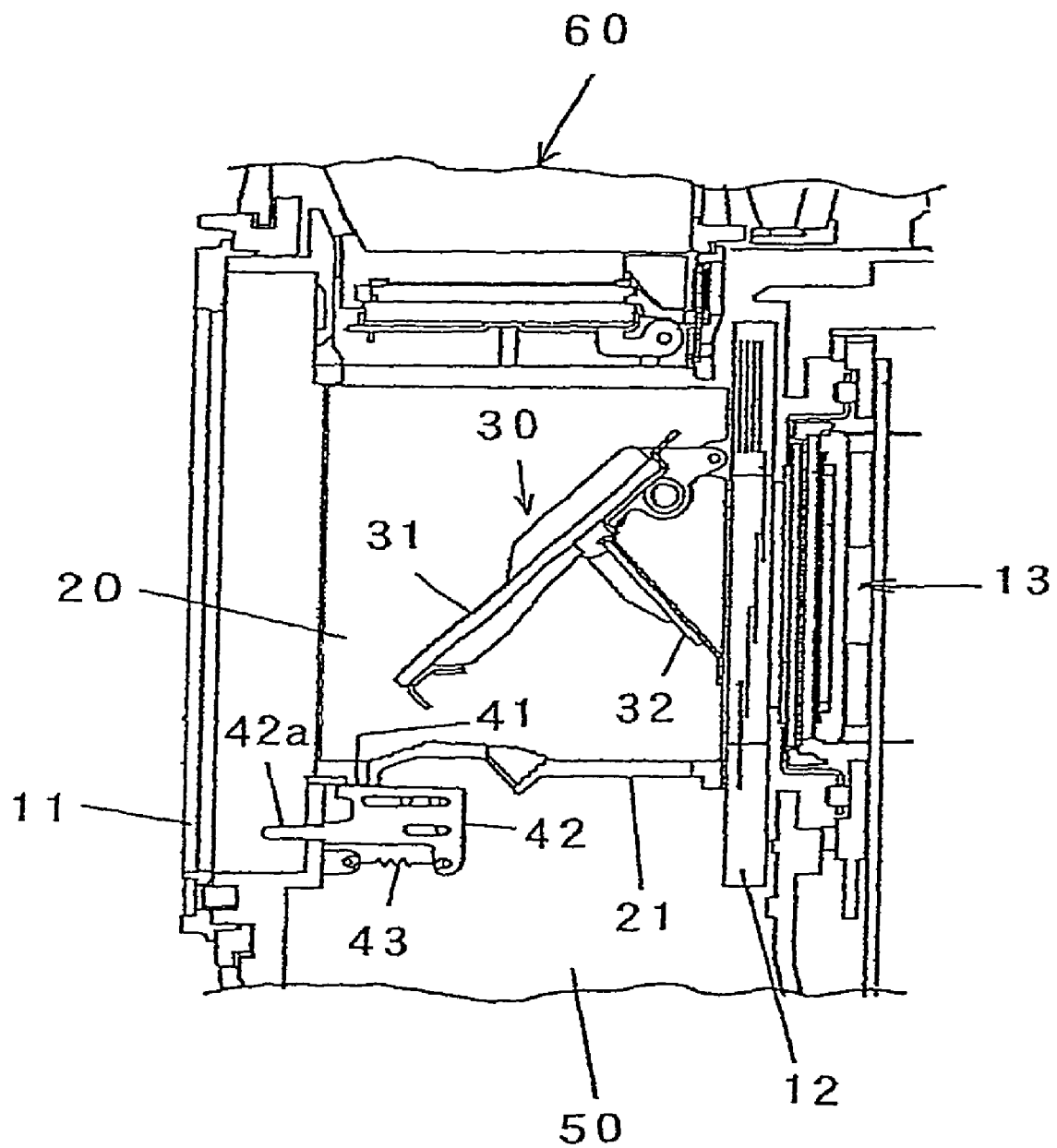
FIG. 4 is an enlarged view of the vicinity of the mirror box in a state in which an interchangeable lens is detached.
Figure 5:
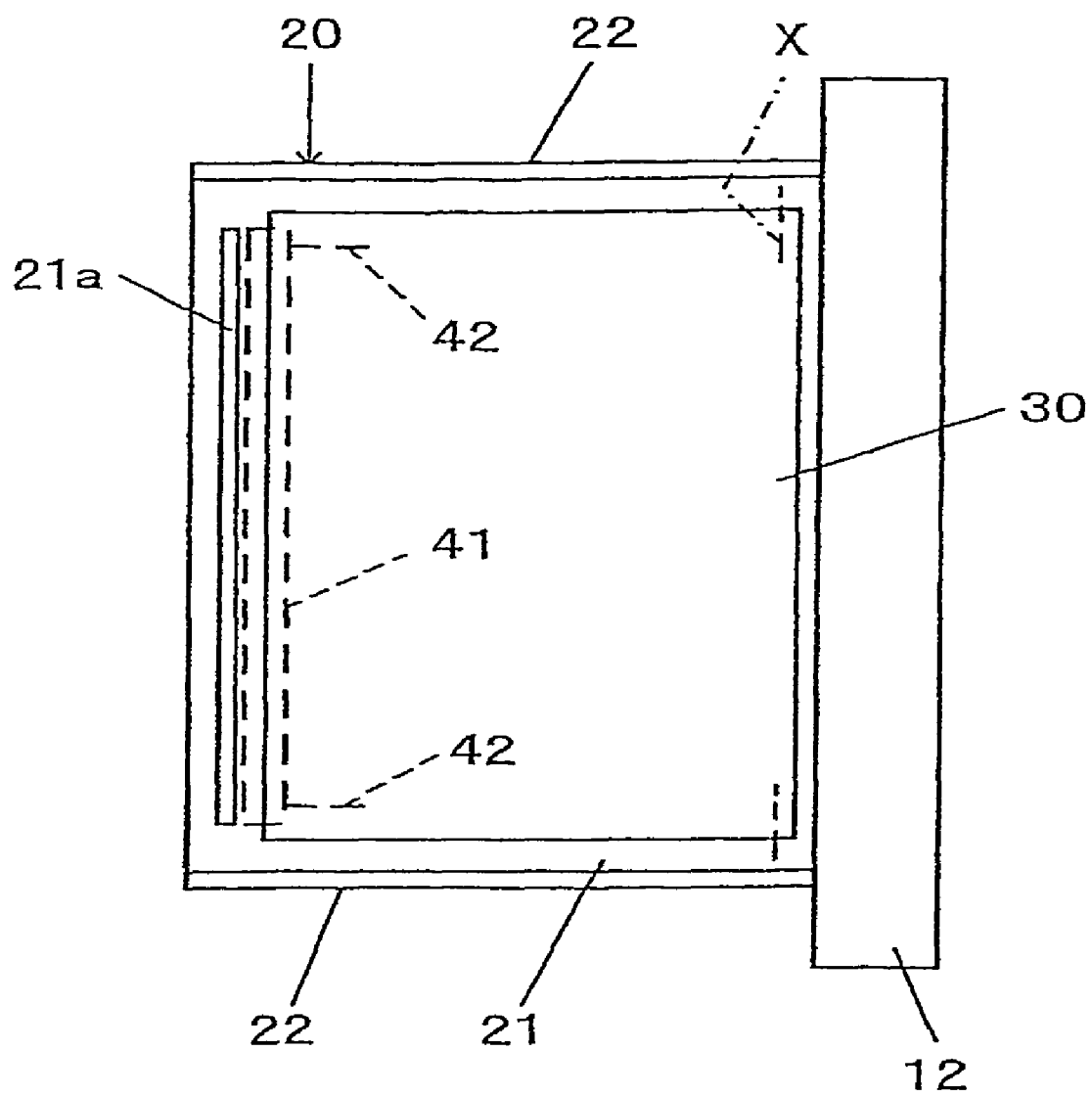
FIG. 5 is a schematic view of the mirror box as seen from above.

FIGS. 3 and 4 are enlarged views of the vicinity of the mirror box 20. FIG. 5 is a schematic view of the mirror box 20 as seen from above (from the side of a viewfinder). The mirror unit 30 includes a main mirror unit 31 which in turn includes a main mirror, which is a half mirror, and a support member therefor as well as a submirror unit 32 that includes a submirror and a support member therefor.

Figure 6:
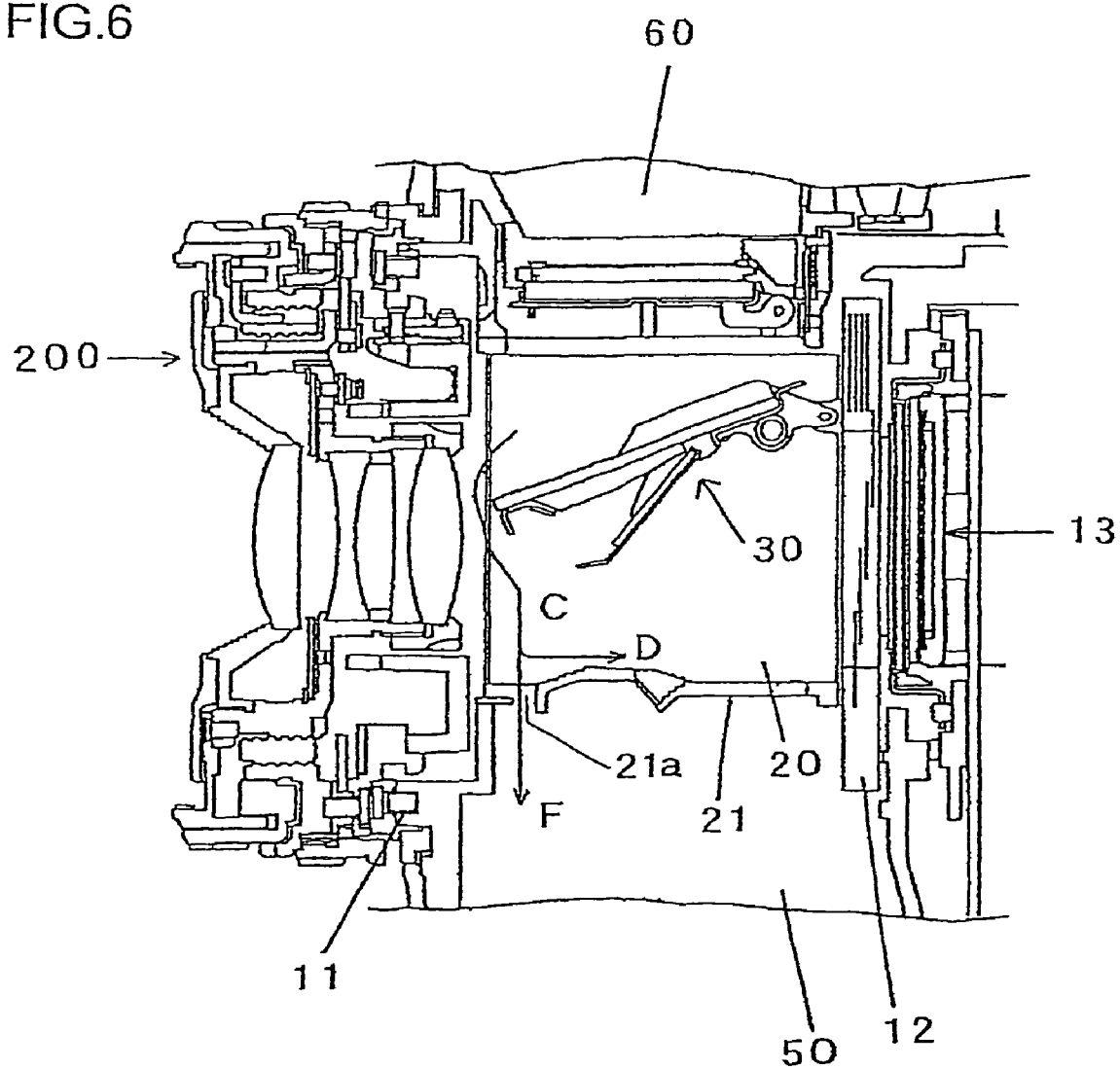
FIG. 6 is a view illustrating the flow of air while the mirror unit is being raised.
Figure 7:
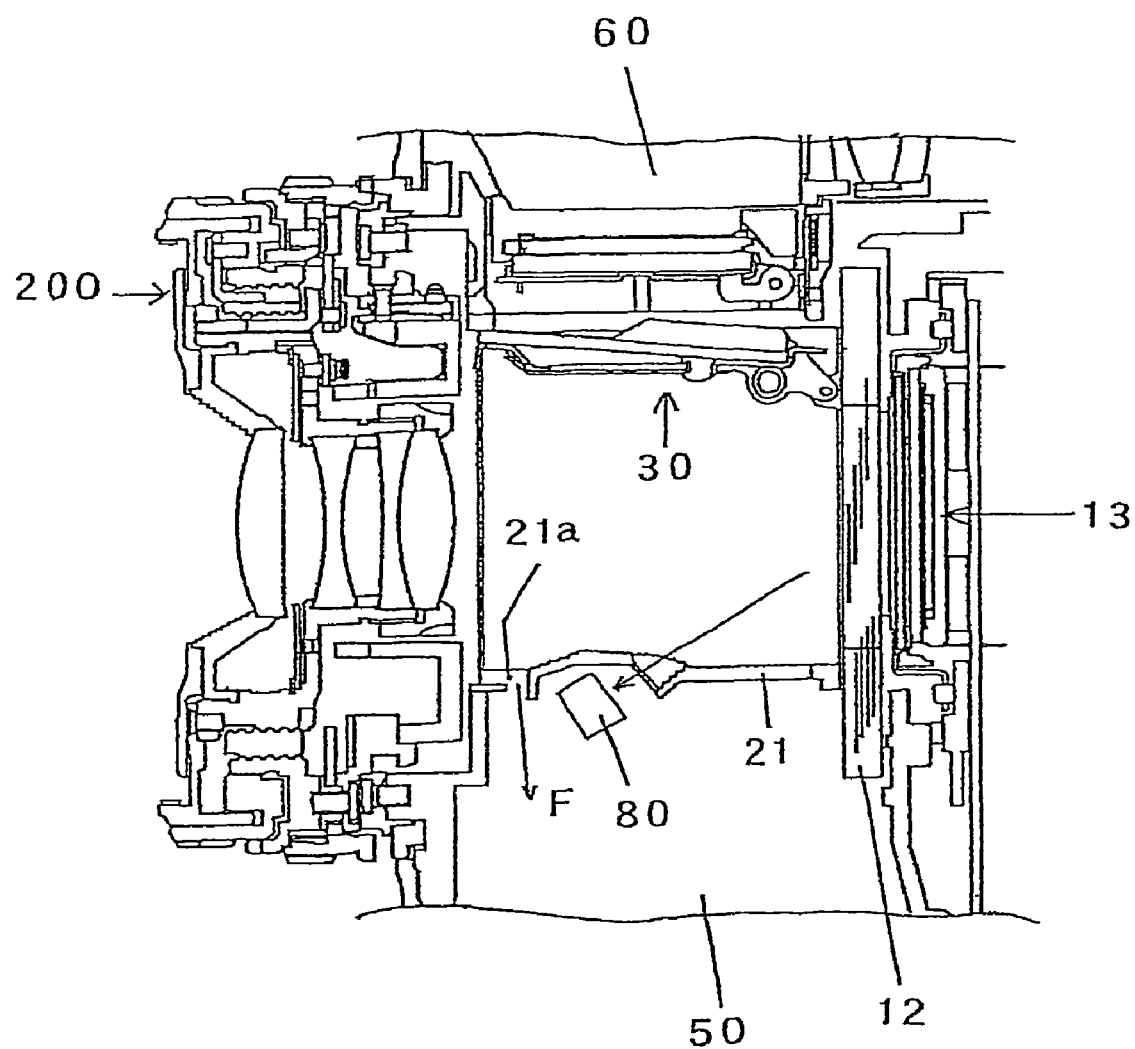
FIG. 7 is a view illustrating the mirror unit in a state in which it has been raised to a photographing position.

The main mirror unit 31 is rotatably supported on one end thereof around an X-axis along a lateral direction of the camera in a rear part of the mirror box 20 (see FIG. 3). The submirror unit 32 is supported on the main mirror unit 31 such that the submirror 32 is rotatable around the X-axis along the lateral direction of the camera. The mirror unit 30 is driven by the control circuit 71 through the mirror drive circuit 78 and is rotatable between a viewing position in which the mirror unit 30 is inserted in a photographing light path as shown in FIG. 3 and a photographic position in which the mirror unit 30 is retracted from the photographic light path as shown in FIG. 7. FIG. 6 shows a state in which the mirror is on the way of being rotated.

In a lower space 50 of the mirror box 20, there is provided a flash-sensor unit 80 (see FIG. 7). At the back of the flash-sensor unit 80 is arranged a focus detection unit (not shown) and in the front of the flash-sensor unit 80 is arranged a lens drive mechanism (not shown). The flash-sensor unit 80 includes an element that receives light reflected on a screen of the shutter 12 and performs photoelectric conversion of the received light to output a photoelectric conversion signal, which is utilized in flash control.

A bottom plate 21 of the mirror box 20 is bored to form a slit-like air hole 21a that communicates a space in the mirror box 20 with the lower space 50. The function and effect of the air hole 21a is detailed later on. The air hole 21a is provided closer to the photographic lens 200 than the flash-sensor unit 80 is (see FIG. 7), preferably closer to the photographic lens 200 than an edge of the mirror unit 30 on the side to the photographic lens 200 in the viewing position is (see FIG. 3). The width of the air hole 21a in the direction to front and rear of the camera is, for example, about 1 to about 2 mm in the present embodiment. However, the width may be smaller or larger than this.

The air hole 21a can be opened and closed by the lid member 41. The lid member 41 is supported on a base plate 42. The base plate 42 is supported so as to be movable in the direction to front and rear (in the direction of an optical axis of the photographic lens 200). A tension spring 43 urges the base plate 42 toward the photographic lens 200. In a slot provided in the base plate 42 is fitted a pin that protrudes from the camera body 100. The movement of the base plate 42 is guided with this construction. A protrusion 42a provided in the base plate 42 runs through the camera body 100 and abuts a rear wall 201 of the interchangeable lens 200 to be restricted of the movement of the base plate 42 as shown in FIG. 3. In this state, the lid member 41 is retracted at the back of the air hole 21a and the air hole 21a is open.

On the other hand, as shown in FIG. 4, when the interchangeable lens 200 is detached from the mount 11, the pressing force on the protrusion 42a is released. On this occasion, the base plate 42 is moved toward the lens mount 11 by the force urged thereon by the spring 43, and interlocked with the movement of the base plate 42, the air hole 21a is closed by the lid member 41.

Note that in FIGS. 6 and 7, the lid member 41 and its drive mechanism (the base plate 42 and the tension spring 43) are not shown. Further, it would be also acceptable to configure the digital camera such that the air hole 21a is opened due to retraction of the lid member 41 by the opening/closing mechanism 75 controlled by the control circuit 71 (see FIG. 15) while the mirror unit 30 is being rotated and when the mirror unit 30 is not being rotated, the air hole 21a is closed by the lid member 41. Also, it would be acceptable to configure the digital camera such that when the power of the digital camera is turned ON, the opening/closing mechanism 75 controlled by the control circuit 71 (see FIG. 15) causes the lid member 41 to be retracted to open the air hole 21a whereas when the power of the digital camera is turned OFF, the opening/closing mechanism 75 causes the lid member 41 to close the air hole 21a.

The imaging unit 13 is an integral structure of an image sensor 13a such as a CCD and an optical filter (such as an optical low pass filter or an infrared cut filter) 13b. Light flux that has passed through the opening of the shutter 12 transmits the optical filter 13b and is received by the image sensor 13a. The imaging sensor 13a converts the received light to a photoelectrically converted output, from which an image data is generated and stored.

In the digital camera thus constructed, when photography is not performed, the mirror unit 30 is in the viewing position shown in FIG. 3 and is inserted in the photographic light path. For this reason, part of the light flux from the photographic subject that is incident into the mirror box 20 is reflected upward by the main mirror unit 31 and enters the finder optical system 60 and viewed by the user through an eyepiece unit 61 (FIG. 2). Part of the light flux that has transmitted through the main mirror unit 31 is reflected downward by the submirror unit 32 and enters a focus detection unit (not shown) provided in the lower space 50 to contribute to focus detection.

When the release button 1 (see FIG. 1) is pressed all the way down, the control circuit 71 controls to flip up the mirror unit 30 to the photographing position as shown in FIG. 7 and to retract it from the photographic light path through the mirror drive circuit 75. Then, the shutter 12 is opened and the light flux incident into the mirror box 20 passes through the opening of the shutter 12 without being interrupted by the mirror unit 30 and is guided to the imaging unit 13.

When neither the photographic lens 200 nor a cap is mounted on the lens mount 11, the mirror box 20 communicates with an external space through the lens mount 11 and hence minute dust floating in the atmosphere could come into the mirror box 20 from the lens mount 11. Further, the dust generated in the camera, for example, when the shutter 12 or the like is driven floats in the mirror box 20. When the dust in the mirror box 20 adheres to the imaging unit 13, in particular the front of the optical filter 13b, the dust may appear on the photographed image to decrease the visual quality of the image.

Explanation is made on the mechanism in which dust adheres to the optical filter 13a.

Figure 8:
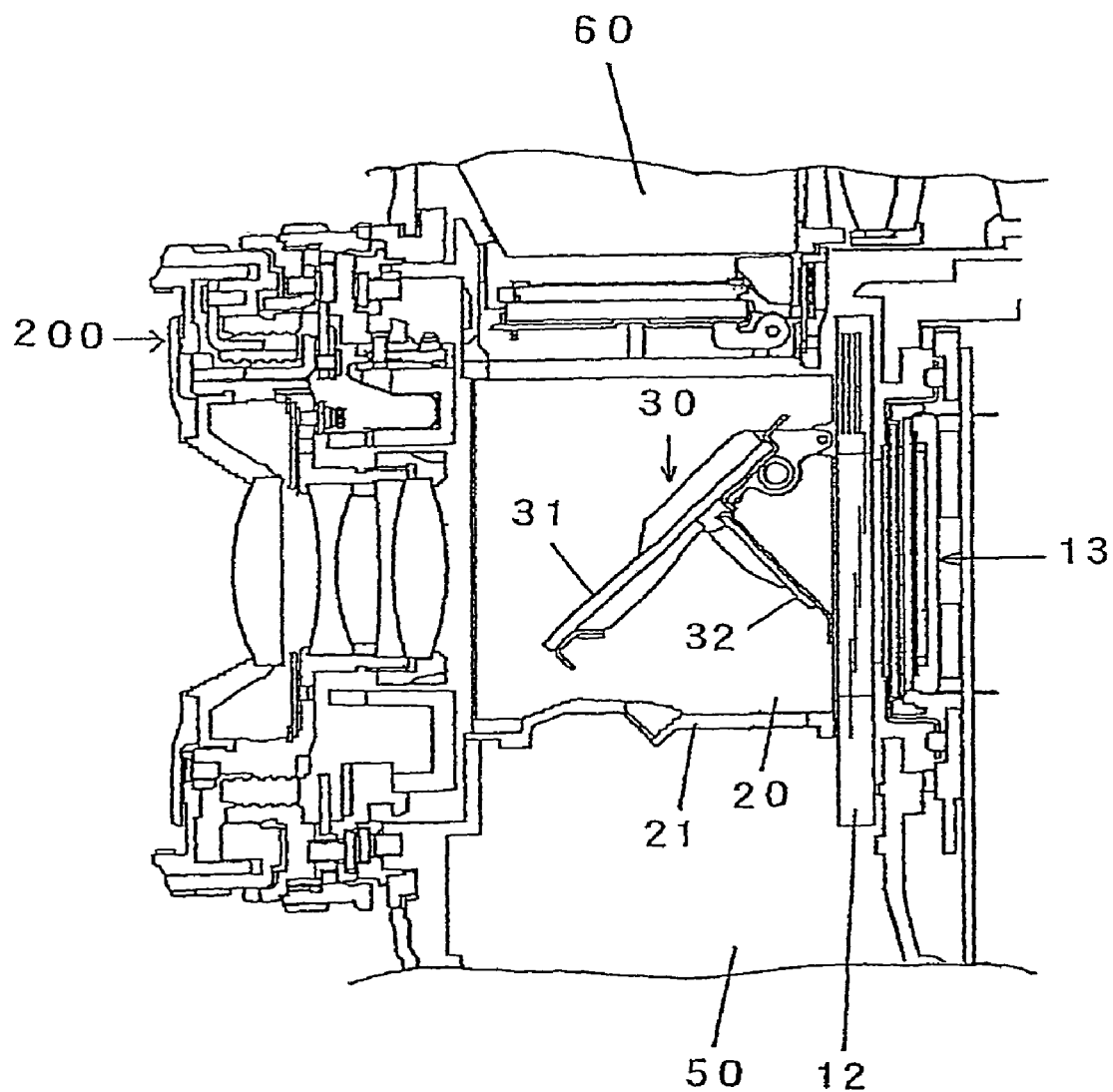
FIG. 8 is a view of a conventional camera illustrating the flow of air when the mirror unit is in a viewing position.
Figure 9:
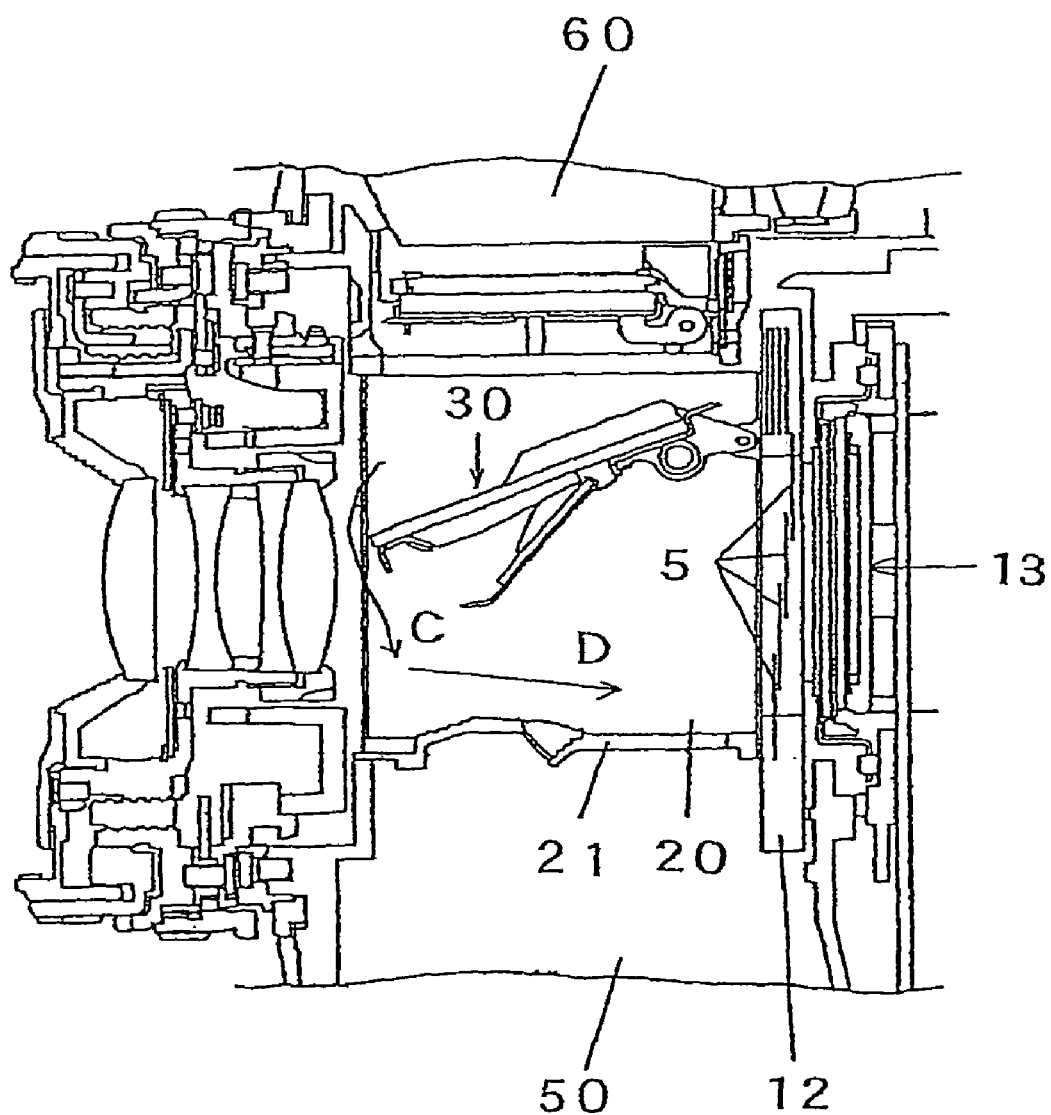
FIG. 9 is a view similar to FIG. 8, illustrating the state in which the mirror unit is being raised.
Figure 10:
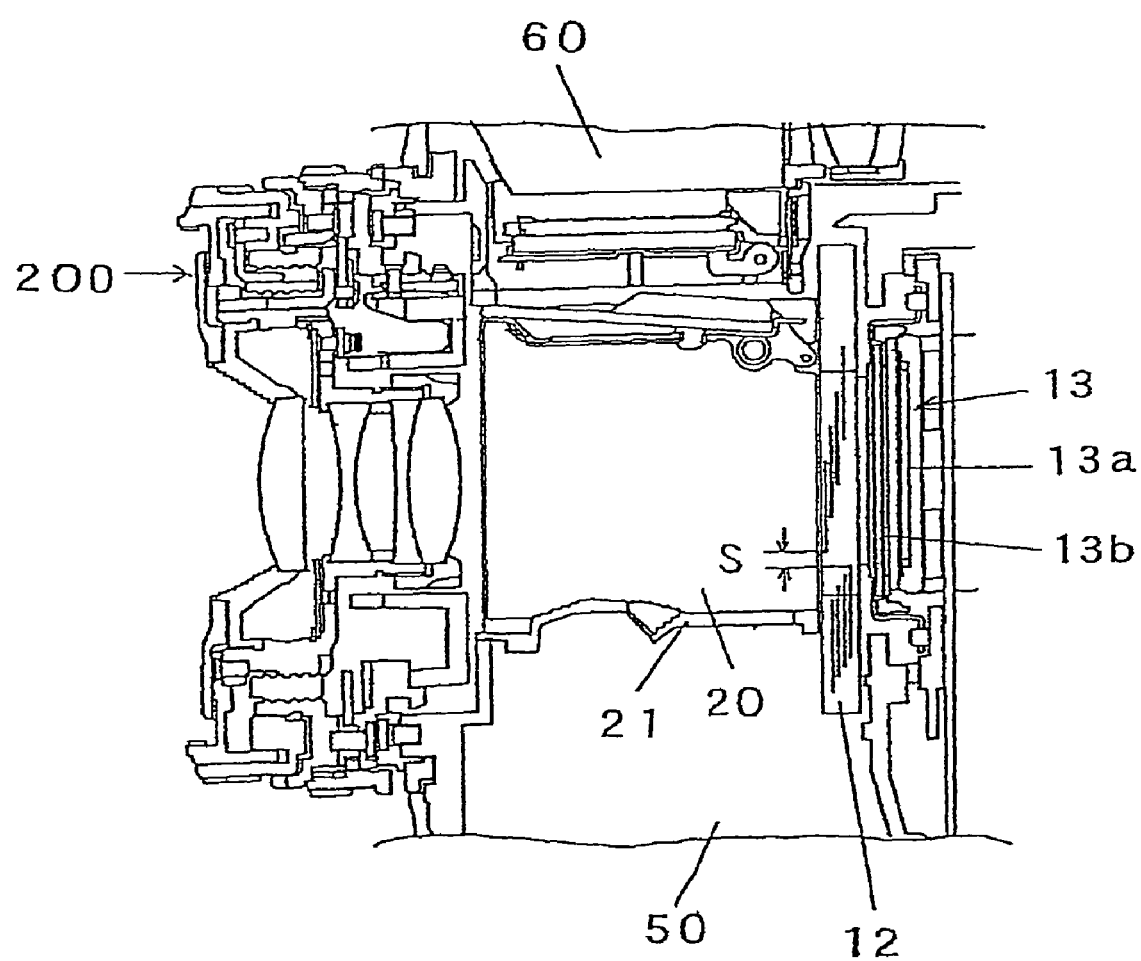
FIG. 10 is a view similar to FIG. 8, illustrating the state in which the mirror unit is in the photographing position.

FIGS. 8 to 10 show an example of a conventional camera that is provided with no air hole 21a. In FIGS. 8 to 10, parts that have similar functions as those in the present embodiment described above are assigned the same reference numerals.

When the mirror unit 30 is in the viewing position as shown FIG. 8, the space in the mirror box 20 is air-tightly closed by the interchangeable lens 200 and the shutter 12 in the direction to front and rear, by the finder optical system 60 and the bottom plate 21 (see FIG. 11B) in the direction of top and bottom, and by the side walls 22 in the direction of right and left. However, the space in the mirror box 20 is not completely closed. Since the mirror unit 30 is flipped up as shown in FIG. 9 when the release button is pressed, an upper space above the mirror unit 30 is abruptly narrowed, most of the air in the upper space flows down as a relatively rapid stream in the front of the mirror unit 30, that is, a space between the mirror unit 30 and the interchangeable lens 200 (arrow C). On this occasion, the dust in the air moves to the same direction (direction indicated by the arrow C) as entrained in the flow of air.

The air that has flown down collides with the bottom plate 21 of the mirror box 20 to be turned to a different direction to form a flow of air toward the side of the shutter 12 (arrow D). Thereafter, as shown in FIG. 10, the mirror unit 30 reaches the photographing position and when the shutter 12 is opened, the air directed toward the side of the shutter 12 passes through an opening S of the shutter 12 (slit opening) to reach the imaging unit 13. The dust carried by the air adheres to the front surface of the optical filter 13b.

Next, explanation is made on dust controlling effect provided by the air hole 21a.

In the present embodiment, the bottom plate 21 of the mirror box 20 is provided with the air hole 21a on its part in the front of the mirror unit 30 (on the side of the photographic lens 200) and when the interchangeable lens is mounted, the air hole 21a is opened. The position of the air hole 21a is just below the flow of the air that flows down due to the flipping of the mirror unit 30 as shown in FIG. 6, so that most of the air that flows down passes through the air hole 21a and goes straight forward (arrow F) to be discharged into the lower space 50. As a result, most of the dust entrained in the air is also discharged in the lower space 50. Therefore, the amount of the air (dust) that goes in the direction of D on the bottom plate 21 of the mirror box 20 is much more decreased than conventionally and the amount of the dust that adheres on the optical filter 13b after the shutter 12 is opened as shown in FIG. 7 is decreased.

In order to discharge the dust to the outside of the mirror box 20 by utilizing the flow of air generated by the mirror unit 30 to decrease the flow of the air toward the direction D in FIG. 9, the position of the air hole 21a to be formed may be determined as follows.

The air hole 21a is formed only in an area of the bottom plate 21 that is closer to the photographic lens 200 than the edge of the mirror unit 30 on the side of the photographic lens 200.

The air hole 21a may be provided such that at least a part of the air hole 21a is arranged in an area of the bottom plate 21 that is closer to the photographic lens 200 than the edge of the mirror unit 30 on the side of the photographic lens 200.

The air hole 21a may be provided in an area in the direction of rotation of the mirror unit 30 (in the direction of C or in a reverse direction thereto in FIG. 9) of the bottom plate 21 or of a top plate of the mirror box 20.

The position of the air hole 21a in the bottom plate 21 in a direction perpendicular to an optical axis of the photographic lens 200 is preferably in a central part near the optical axis of the photographic lens 200. Although the length of the air hole 21a to its long side (in the longitudinal direction in FIG. 5) is preferably the same as or smaller than the width of the mirror unit 30, it may be larger than the width of the mirror unit 30.

The air hole 21a may be provided in an area closer to the photographic lens 200 than the intersection of the mirror unit 30 in the viewing position and the optical axis of the photographic lens 200.

In this manner, in the present embodiment, by a simple operation such that a part of the mirror box 20 is provided with the air hole 21a without addition of any members, the amount of dust that adheres to the imaging unit 13 can be decreased. The inventors of the present embodiment have conducted experimentation comparing the state in which dust adheres to the optical filter 13b between the structure of the present embodiment and the conventional structure shown in FIGS. 8 to 10. The results confirm that the amount of adherent dust after repeating the photographing operation with the camera body 100 10,000 times can be reduced according to the structure of the present embodiment to about half that of the conventional structure.

When the interchangeable lens 200 is detached from the lens mount 11, the part where the air hole 21a is provided is exposed to the outside. On this occasion, since the air hole 21a is closed by the lid member 41, the members arranged in the lower space 50 are not viewed, so that the appearance of the camera is not deteriorated.

As mentioned above, the operation of discharging dust accompanying driving of the mirror upon photographing has been explained. Next, the operation of discharging dust in time other than photographing is explained.

For example, upon interchanging lenses, there is a possibility that dust outside comes into the inside of the mirror box 20. After the interchange of the lenses, the control circuit 71 detects that the interchangeable lens 200 is attached and controls to flip the mirror unit 30 from the viewing position to the photographing position and then to return it to the viewing position. The driving of the mirror is performed in a state in which the shutter 12 is closed. This enables much of the dust that has come into the mirror box 20 to be discharged to the lower space 50 through the air hole 21a. Thereafter, the dust is discharged also by driving of the mirror upon photographing, so that the amount of the dust that is adherent to the optical filter 13 can be further decreased.

Also, the driving of the mirror may be performed in the same manner as that at the time of interchanging lenses in order to discharge dust in other opportunities than when the lenses are interchanged, for example, when the power to the digital camera is turned ON or OFF. Alternatively, the driving of the mirror may be performed similarly in order to discharge dust in accordance with a specified operation, that is, dust discharge operation, by the user. In both cases, it is preferred that the driving of the mirror is permitted only in a state in which the incoming of dust from outside is blocked, that is, only when the interchangeable lens 200 or the cap is attached to the lens mount 11. Further, the driving of the mirror in the timing other than the photographing is effective even when performed only once but repeating it in a plurality of times enables more dust to be discharged.

Further, the driving of the mirror may be performed in order to remove the dust that has adhered to the optical filter 13b. The driving of the mirror to remove this dust is performed in a state in which the shutter 12 is open. In contrast to the above-mentioned dust discharge action, when the mirror unit 30 is flipped down from the photographing position to the viewing position, the air below the mirror unit 30 flows through the shutter opening against the front surface of the optical filter 13b to blow off the dust thereon. Since the space below the mirror unit 30 is abruptly narrowed according to the flip down of the mirror unit 30, most of the air below the lower space flows in the lower space below the mirror unit 30 in the direction of front and moves to the space in front of the mirror unit 30. This flow causes the dust to move to the space in front of the mirror unit 30 and the dust is discharged to the lower space 50 through the air hole 21a by the next and subsequent actions of the mirror unit 30.

Also, it would be acceptable that the mirror unit 30 is rotated from the photographing position to the viewing position in a state in which the shutter 12 is open, and the mirror unit 30 is rotated from the viewing position to the photographing position in as state in which the shutter 12 is closed. When the mirror unit 30 is rotated from the photographing position to the viewing position, the shutter 12 is open, so that the air below the mirror unit 30 flows through the opening of the shutter 12 against the front surface of the optical filter 13b to blow off the dust thereon. Next, when the mirror unit 30 is rotated from the viewing position to the photographing position, the shutter is in a closed state, and the dust in the mirror box 20 is discharged through the air hole 21a. This operation is performed at least once, preferably a plurality of times to enable the dust adherent to the optical filter 13b to be removed. The driving of the mirror in this case too is preferably permitted only when the interchangeable lens 200 or the cap is attached to the lens mount 11. This operation may be performed at the time of turning ON or OFF the power of the digital camera, or in response to a specified operation by the user. Further, the removal of the dust may be performed as follows. That is, the user judges whether or not dust is adherent to the optical filter 13b based on the photographed image and when it is judged that the dust is adherent, the driving of the mirror is performed in response to the dust discharge operation by the user to discharge the dust. In this case, in order to make it easy to judge whether or not dust is adherent, it would be acceptable to photograph a white object by the digital camera and judge whether or not dust is adherent based on the photographed image. Further, it would be acceptable to perform the judgment whether or not dust is adherent by the control circuit 71 and to automatically perform the driving of the mirror to remove the dust.

Further, the conventional method in which the imaging unit is vibrated to shake off dust and the above-mentioned dust discharge method according to the present embodiment may be used in combination. In this case, by performing the driving of the mirror for the removal of the dust while vibrating the imaging unit 13, the efficiency of dust removal is increased due to synergism between the vibration and the flow of air. Hereinafter, the operation in this case is explained.

First, in a state in which the shutter 12 is open, vibration of the optical filter 13b is started in order to remove the dust adherent to the optical filter 13b. Then, the mirror unit 30 is driven a plurality of times to discharge from the air hole 21c. When the driving of the mirror unit 30 is completed, the shutter 12 is closed and the vibration of the optical filter 13b is stopped. The adherent dust is removed by vibrating the optical filter 13b and the removed dust is discharged through the air hole 21c by driving the mirror unit 30. Also, by driving the mirror unit 30, the dust remaining on the surface of the optical filter 13b can be removed. Note that the direction of driving the mirror unit 30 is not particularly limited. It is preferred to arrange the mirror unit 30 in the photographing position and then perform an operation to drive it to the viewing position.

Note that it would also be acceptable to vibrate the optical filter 13b in a state in which the shutter 12 is open to remove the dust, and to close the shutter 12 before the mirror unit 30 is driven and to stop the vibration of the optical filter 13b. Also, the vibration of the optical filter 13b may be performed only for the first time. It is preferred that the dust removal operation is permitted only when the interchangeable lens 200 or the cap is attached to the lens mount 11.

Further, the dust detection may be performed as follows. That is, an illumination means (not shown) such as an LED is provided below the mirror box 20 and the imaging unit 13 is illuminated through an opening (not shown) in the lower surface of the mirror box 20 to detect dust adherent to the optical filter 13b. Then, based on the result of the dust detection, it is judged whether or not it is necessary to remove the dust, and when the result is affirmative, the driving of the mirror is performed in order to remove the dust.

Figure 11A:
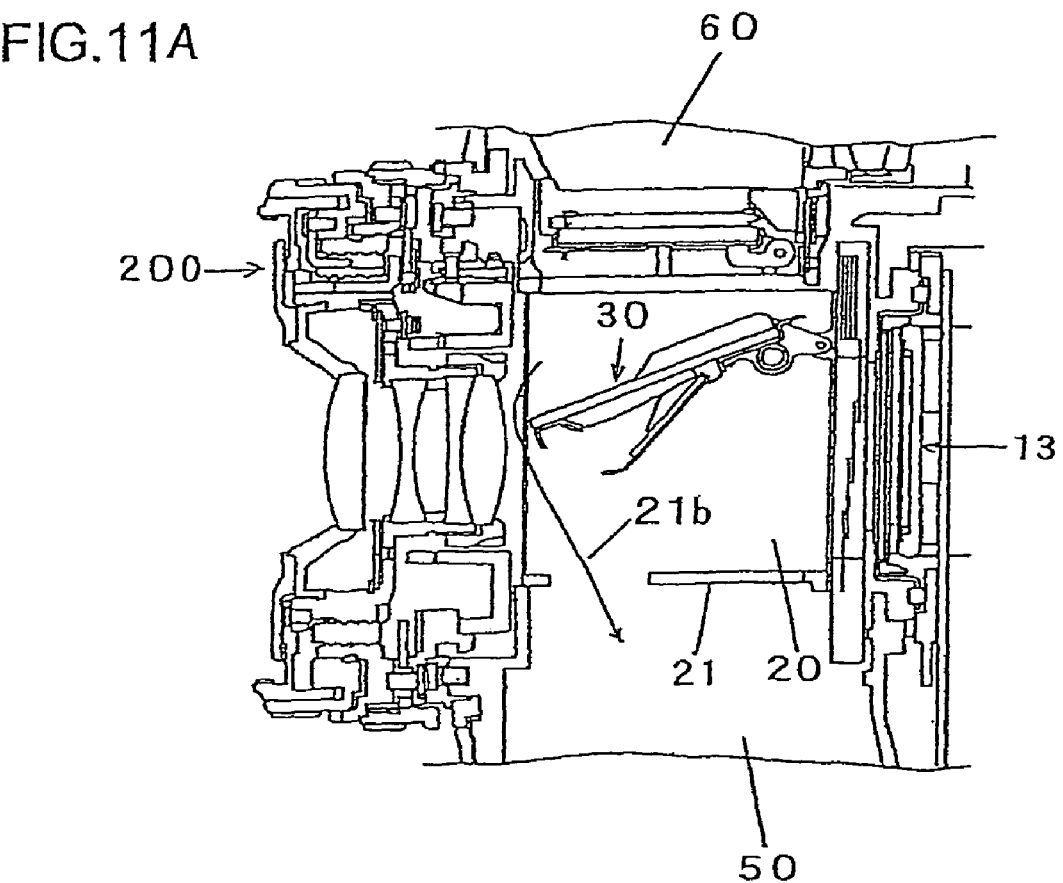
FIGS. 11A and 11B are each a view showing an example of the camera provided with a large air hole.
Figure 11B:
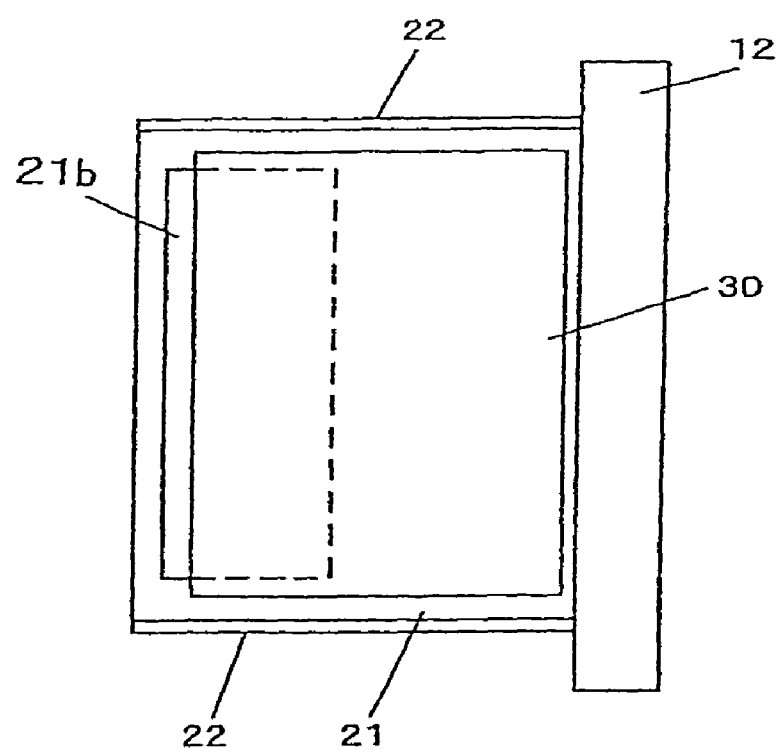
Figure 12:
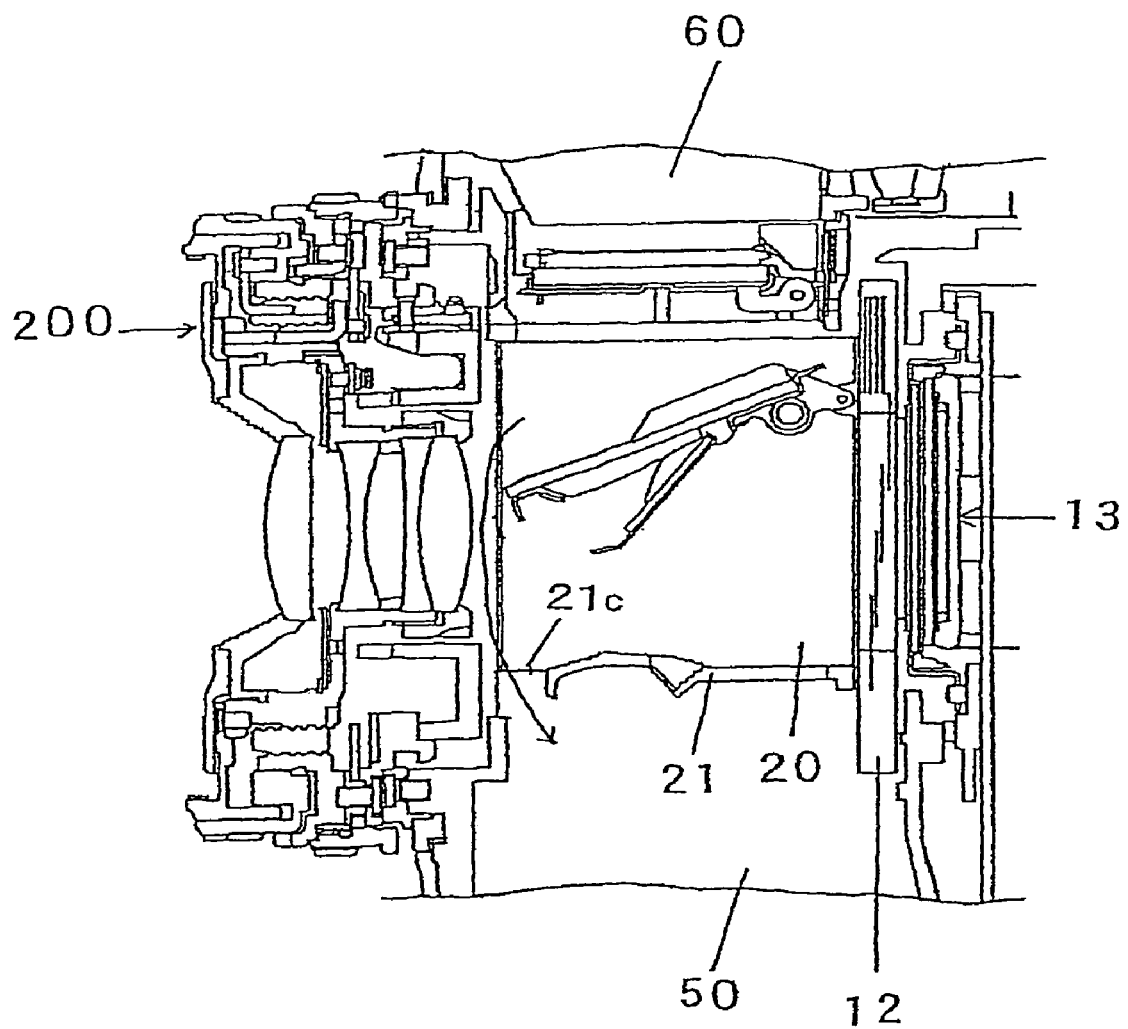
FIG. 12 is a view showing an example in which an air hole is provided at a corner portion defined by the bottom plate of the mirror box and a lens mount.

Note that the number and shape of the air holes 21a may be optional. In the above-mentioned embodiment, the air hole 21a is provided in a part of the bottom plate 21 that is closer to the photographic lens 200 than the edge of the mirror unit 30 on the side of the photographic lens 200. However, for example, as shown in FIGS. 11A and 11B, the air hole 21a may be provided as extending to the rearward of the edge of the mirror unit 30 on the side of the photographic lens 200. Further, as shown in FIG. 12, the air hole 21c may be extended on the side of the photographic lens 200.

Figure 13:
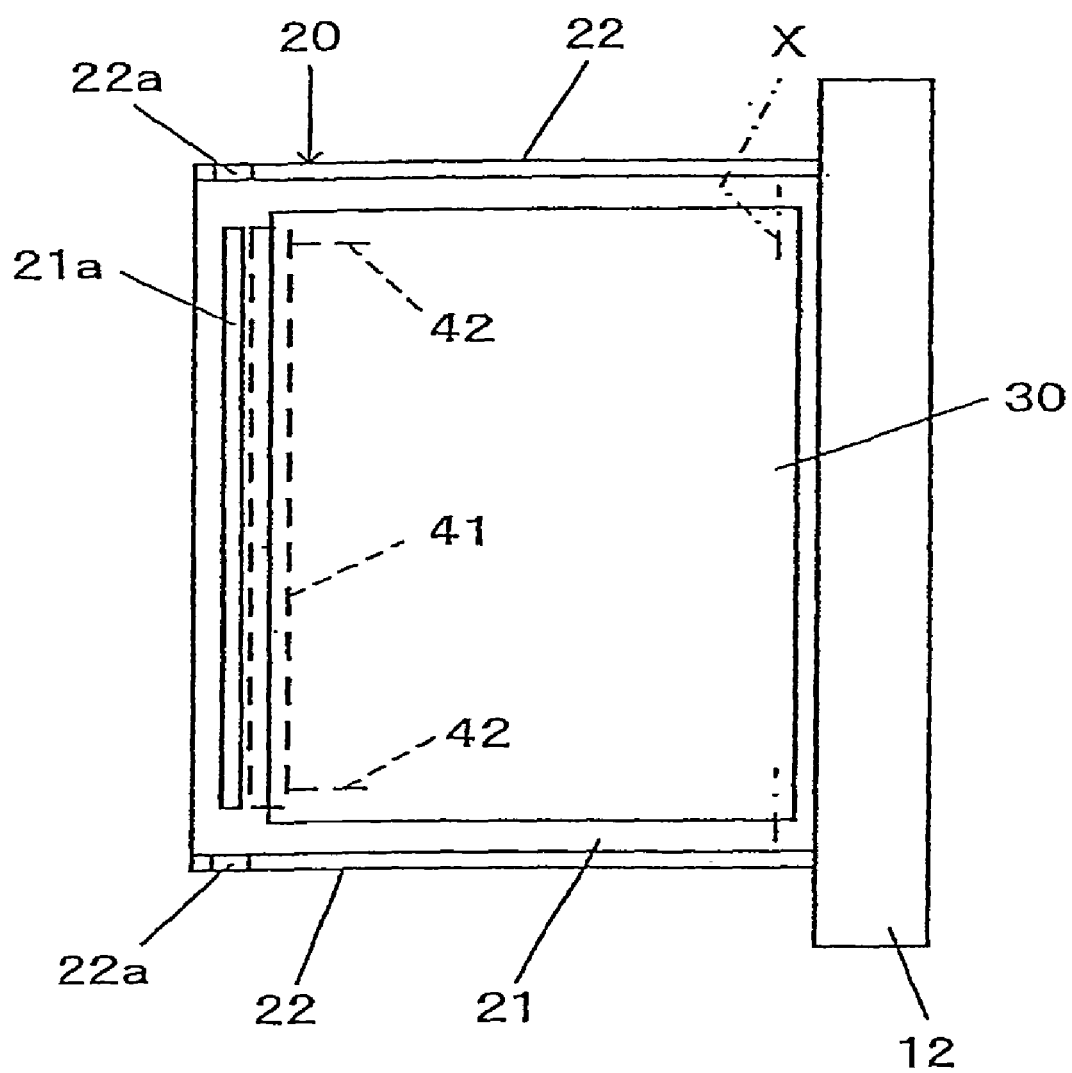
FIG. 13 is a view showing an example in which a side wall of the mirror box is provided with an air hole.

Further, it is expected that the air hole 21c provides the dust removal effect when it is provided in a surface other than the bottom plate 21 of the mirror box 20 as far as the condition is satisfied that the air hole 21c includes a part that is further closer to the photographic lens 200 than the edge of the mirror unit 30 in the viewing position on the side of the photographic lens 200. FIG. 13 shows an example in which in addition to the air hole 21a in the bottom plate 21 of the mirror box 20, the air holes 22a are provided on both side walls 22 of the mirror box 20, respectively. An air hole may be provided on an upper plate of the mirror box 20.

Figure 14:
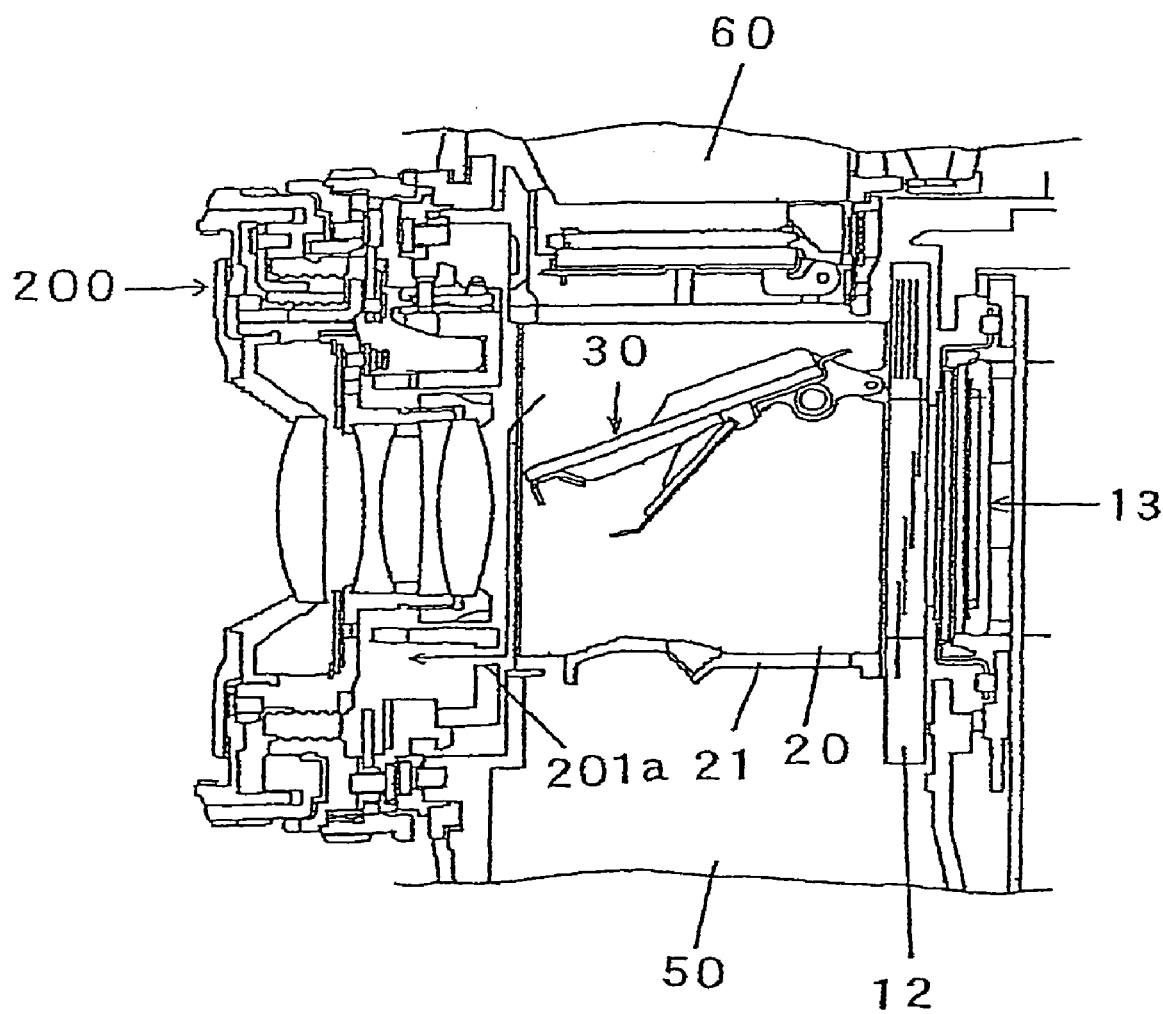
FIG. 14 is a view showing an example in which the interchangeable lens is provided with an air hole.

Further, instead of providing an air hole in the mirror box 20, an air hole 201a may be provided for example, in a rear wall surface 201 (a surface opposing the mirror unit 30; see FIG. 3) of the interchangeable lens 200, as shown in FIG. 14. In this case, by the flip up of the mirror unit 30, air containing dust in the mirror box 20 is discharged through the air hole 201a to a space in the interchangeable lens 200 to provide an effect similar to that mentioned above.

Further, in the above-mentioned embodiment, explanation has been made on the example in which the mirror unit 30 is rotated about the axis X in the lateral direction of the digital camera. However, the present invention may be applied to a camera in which the mirror unit 30 is rotated about an axis in the direction of front and rear of the camera.

-Second Embodiment-

Referring to FIGS. 16 to 20, explanation is made on a digital camera according to a second embodiment of the present invention. In the following description, the same components as those in the first embodiment are assigned the same reference numerals and explanation is focused on differences between them. In the second embodiment, the flow of air generated by the rotation of the mirror unit 30 is used to remove dust (foreign matter) adherent to the surface of the optical filter 13b as follows.

Figure 16:
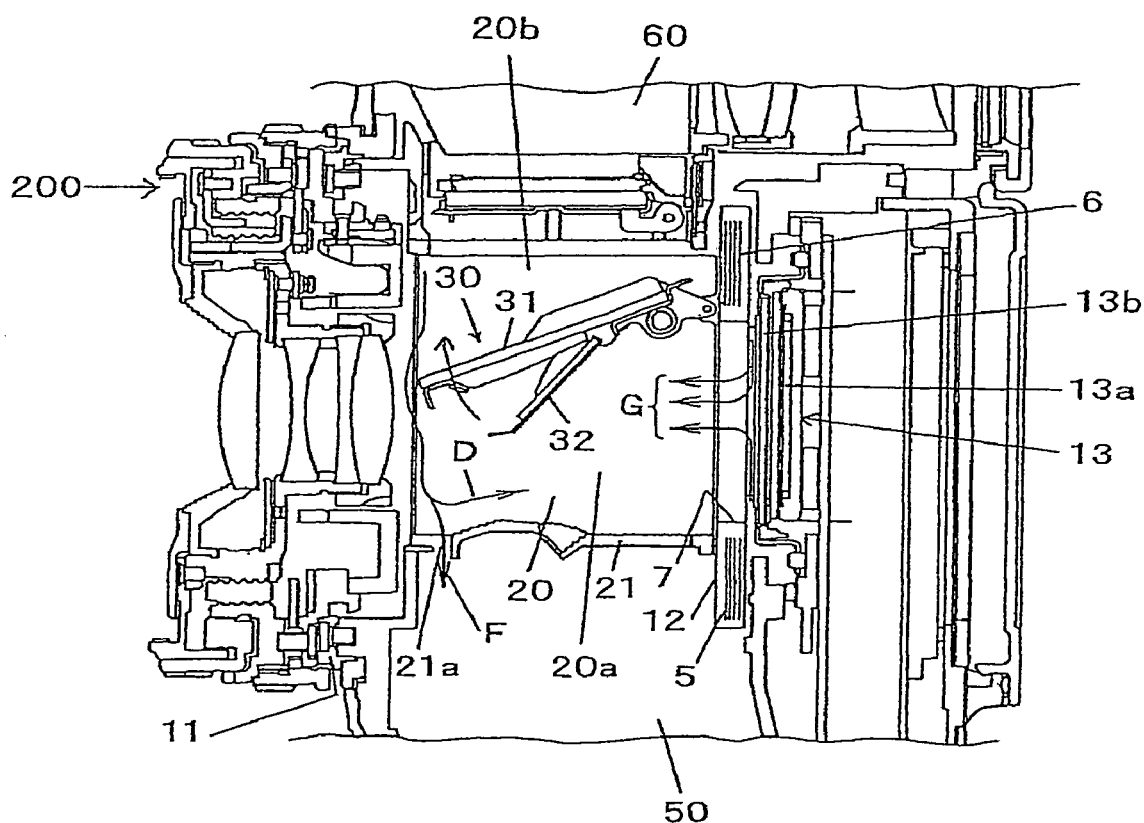
FIG. 16 is a diagram illustrating the flow of air while the mirror unit is being raised in the digital camera according to the second embodiment.

As shown in FIG. 16, when the mirror unit 30 is rotated from the viewing position to the photographing position, a negative pressure is generated in a space 20a on the right hand side in the figure of the main mirror unit 31 (space behind the main mirror). Results of simulation conducted by the inventors of the present invention indicate that this decrease in the pressure of air generates a flow of air as shown by an arrow G. The flow of air indicated by the arrow G in the front of the optical filter 13b proceeds as follows. That is, air around the optical filter 13b flows along the front surface of the optical filter 13b toward the center of the front surface of the optical filter 13b. Thereafter, the air turns to face toward the interchangeable lens 200 arranged in front (left hand side in the figure) of the optical filter 13b. As a result, the flow of air indicated by the arrow G draw in (sucks out) the dust adherent on the front surface of the optical filter 13b into the mirror box 20.

Accordingly, in the digital camera according to the second embodiment, when the camera is set in a cleaning mode as detailed hereinbelow, the mirror unit 30 is rotated from the viewing position to the photographing position and concomitantly, along the way while the mirror unit 30 is being rotated from the viewing position to the photographing position, the shutter 12 is opened to remove the dust adherent to the front surface of the optical filter 13b as mentioned above.

Note that as explained in the first embodiment, when the mirror unit 30 is rotated from the viewing position to the photographing position, a space 20b on the left hand side in the figure of the main mirror unit 31 (space in the front of the main mirror) is narrowed to generate a flow of air (arrow C, see FIG. 6) that goes down a space between the mirror unit 30 and the interchangeable lens 200. A part of the flow of air (arrow C) goes against the bottom plate 21 of the mirror box 20 to turn its direction to form a flow of air toward the shutter 12 (arrow D). The flow of air directed toward the shutter 12 (arrow D) causes the dust in the mirror box 20 to be pushed to the side of the shutter 12. Therefore, when the shutter 12 is open, there is a possibility that the dust in the mirror box 20 will adhere again to the front surface of the optical filter 13*b* due to the flow of air directed toward the shutter 12 (arrow D).

Results of simulation conducted by the inventors of the present invention indicate that there is a certain time after generation of the flow of air indicated by the arrow G until the flow of air toward the side of the shutter 12 (arrow D) reaches near the shutter 12. That is, it revealed that there is a time lag from suction of the dust adherent to the front surface of the optical filter 13*b* into the mirror box 20 by the flow of air indicated by the arrow G until the flow of air toward the side of the shutter 12 (arrow D) reaches near the shutter 12.

Accordingly, the digital camera according to the second embodiment is configured such that the shutter 12 is opened on the way during the rotation of the mirror unit 30 from the viewing position to the photographing position as mentioned above and then after lapse of a predetermined time, the shutter 12 is closed. This prevents the dust from adhering again to the front surface of the optical filter 13*b* due to the flow of air toward the shutter 12 (arrow D). Note that the speed of operation of the shutter 12 is much higher than the speed of rotation of the mirror unit 30. That is, as compared with the time required for rotating the mirror unit 30 from the viewing position to the photographing position, the time required for opening/closing the shutter 12 is considerably short. Accordingly, during the rotation of the mirror unit 30 from the viewing position to the photographing position, that is, after the mirror unit 30 started its rotation from the viewing position and before it reaches the photographing position, it is possible to open/close the shutter 12 as mentioned above.

Figure 17:
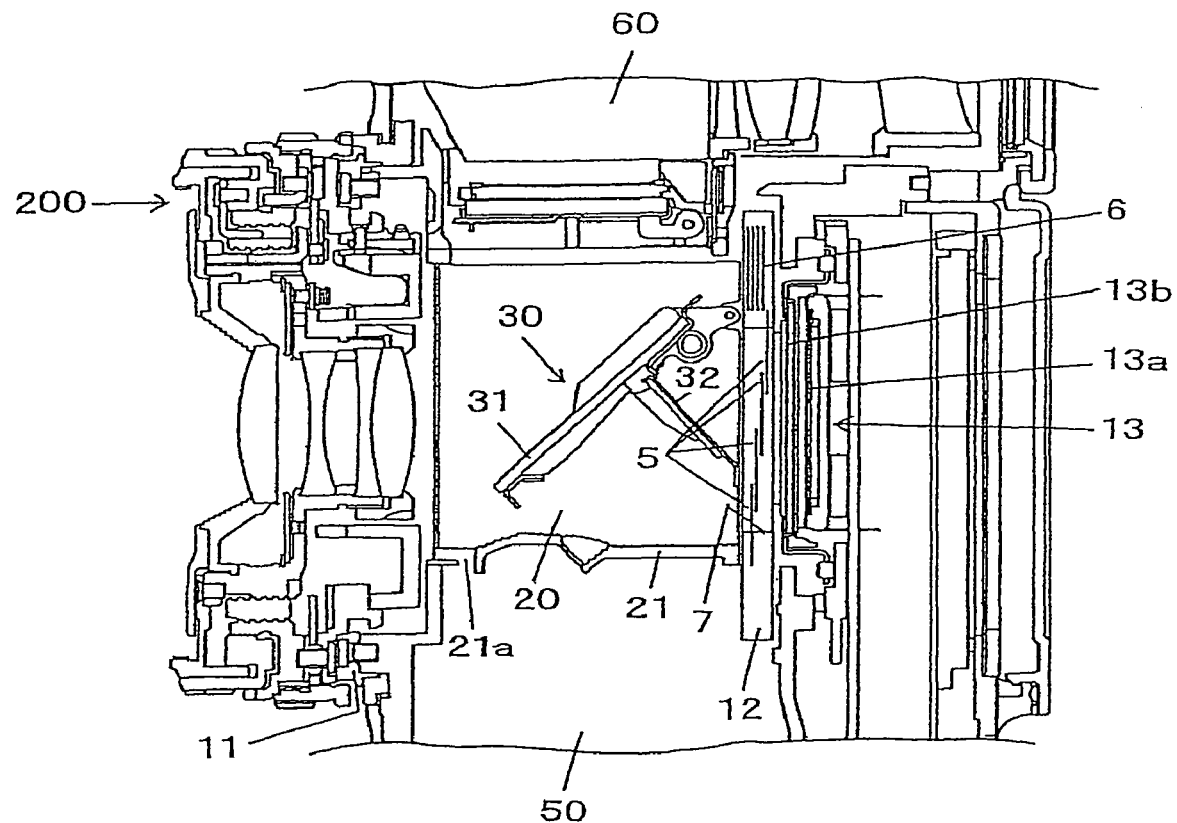
FIG. 17 is a diagram illustrating the state of the mirror unit before the raising of the mirror unit starts.

To be concrete, the digital camera according to the second embodiment operates as follows. Note that in the figures with reference to which the second embodiment is explained, the lid member 41 and the driving mechanisms (42, 43) thereof are not shown. Before release of the shutter is started, the mirror unit 30 stops in the viewing position and the shutter 12 is shut as shown in FIG. 17. Note that the shutter 12 includes front curtain shielding blades 5 and rear curtain shielding blades 6 and is configured to shield (close) or open a shutter opening (photographing aperture) 7 thereby. Before the releasing of the shutter is started, the front curtain shielding blades 5 are charged to engage with a magnet (not shown) such that the photographing aperture 7 is shielded. The rear curtain shielding blades 6 are charged to retract to above the photographing aperture 7 and engage with the magnet (not shown).

Now, when a predetermined operation is performed by the operation unit 74, the control circuit 71 controls to change the operation mode of the digital camera to a cleaning mode and controls the units as follows. First, the control circuit 71 controls through the mirror drive circuit 78 to rotate the mirror unit 30 from the viewing position to the photographing position. Also, the control circuit 71 controls the magnet (not shown) engaged with the front curtain shielding blades 5 to be excited. When the magnet (not shown) engaged with the front curtain shielding blades 5 is excited, the front curtain shielding blades 5 move toward the lower part of the photographing aperture 7 due to biasing force urged by a spring (not shown) to open the photographing aperture 7. This results, as shown in FIG. 16, in the photographing aperture 7 opened on the way while the mirror unit 30 is being rotated from the viewing position to the photographing position. Accordingly, as mentioned above, the flow of air indicated by the arrow G causes the dust adherent to the front surface of the optical filter 13*b* to be sucked into the mirror box 20.

Note that the timing in which the control circuit 71 controls the magnet (not shown) engaged with the front curtain shielding blades 5 to be excited may be before, concurrently with, or after the control circuit 71 sends a control signal to the mirror drive circuit 75 so as to rotate the mirror unit 30 from the viewing position to the photographing position. That is, the shutter 12 may be opened before the mirror unit 30 starts its rotation from the viewing position to the photographing position. Alternatively, the shutter 12 may be opened after the mirror unit 30 starts its rotation from the viewing position to the photographing position. It is only necessary that the dust adherent to the front surface of the optical filter 13*b* can be sucked into the mirror box 20 by the flow of air indicated by the arrow G as mentioned above.

Figure 18:
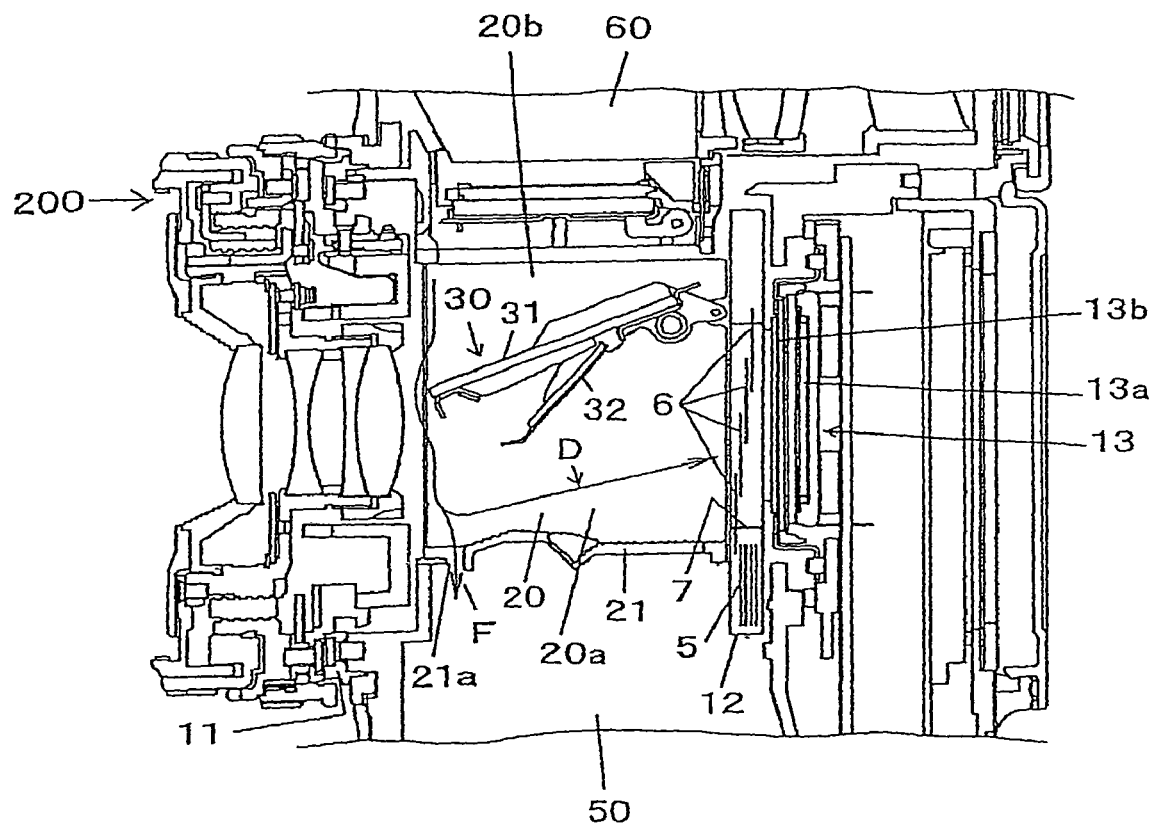
FIG. 18 is a diagram illustrating the flow of air while the mirror unit is being raised and after the post-screen shielding panes 6 close the photographing aperture 7.

The control circuit 71 controls the units such that the magnet (not shown) engaged with the rear curtain shielding blades 6 is excited after a predetermined time T has elapsed from the time in which the magnet (not shown) engaged with the front curtain shielding blades 5 is excited. When the magnet (not shown) engaged with the rear curtain shielding blades 6 is excited, the rear curtain shielding blades 6 move toward the lower part of the photographing aperture 7 due to a biasing force urged by a spring (not shown) to close the photographing aperture 7 as shown in FIG. 18.

The predetermined time T is set as appropriate such that the rear curtain shielding blades 6 close the photographing aperture 7 before the flow of air toward the side of the shutter 12 (arrow D) reaches near the shutter 12. Therefore, there is no possibility that the dust adheres again to the front surface of the optical filter 13*b* by the flow of air toward the side of the shutter 12 (arrow D). Note that it is before the mirror unit 30 reaches the photographing position when the flow of air toward the side of the shutter 12 (arrow D) reaches near the shutter 12, so that the shutter 12 is closed before the mirror unit 30 reaches the photographing position.

Figure 19:
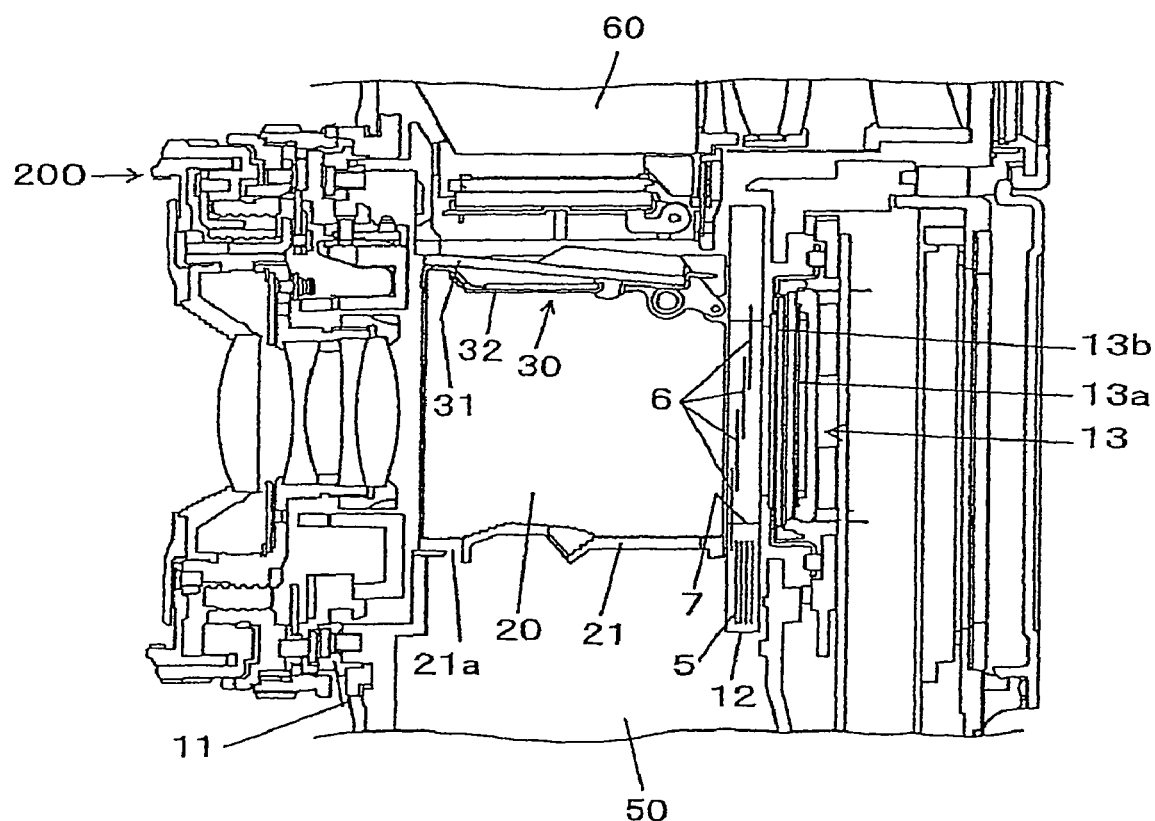
FIG. 19 is a diagram illustrating the state of the mirror unit raised to the photographing position.

After the above-mentioned operation for drawing the dust in, the digital camera is brought into a state in which as shown in FIG. 19, the mirror unit 30 is rotated to the photographing position where it stops and the rear curtain shielding blades 6 shield the photographing aperture 7. This state is the same as the state after the operation of release of the shutter upon ordinary photographing. Therefore, by performing a so-called charging operation as is done in the conventional digital camera, the digital camera can return to the state before the release of the shutter as shown in FIG. 17. That is, after the above-mentioned operation for drawing the dust in, the control circuit 71 controls the units such that a charging operation is performed. This makes the digital camera return to the state before the release of the shutter as shown in FIG. 17. The control circuit 71 controls the units such that after completion of the charging operation, the digital camera is changed from the cleaning mode to the photographing mode so as to be in a photographing standby state. Note that it would also be acceptable that the control circuit 71 controls the units such that after repeating a few times the operation of removing the dust adherent to the front surface of the optical filter 13*b*, the mode of the digital camera is changed from the cleaning mode to the photographing mode so as to be in the photographing standby state.

Figure 20:
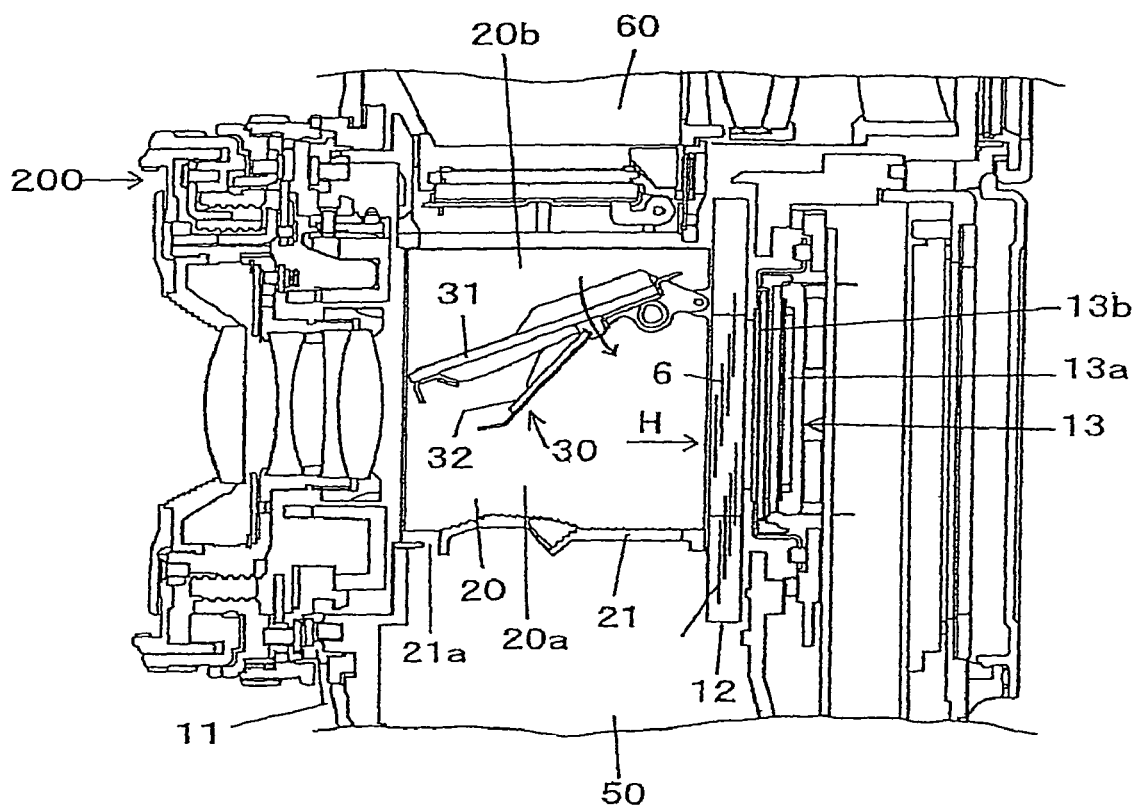
FIG. 20 is a diagram illustrating the state of the mirror unit on the way while the mirror unit is being lowered to the viewing position again.

FIG. 20 is a diagram illustrating the state of the mirror unit on the way while the mirror unit is returning to the state before the release of the shutter. As shown in FIG. 20, when the mirror unit returns to the state before the release of the shutter, the front curtain shielding blades 5 and the rear curtain shielding blades 6 are moved upward to be charged while maintaining the state in which the photographing aperture 7 is closed. For this reason, the flow of air toward the shutter 12 indicated by the arrow H that is generated when the mirror unit 30 is rotated toward the viewing position can not reach the front surface of the optical filter 13*b*. Therefore, there is no possibility that the dust in the mirror box 20 adheres again to the front surface of the optical filter 13b by the flow of air indicated by the arrow H.

The digital camera according to the second embodiment has the following operational effects as well as the operational effects of the digital camera according to the first embodiment.

(1) The digital camera is configured such that the shutter 12 is opened after the mode of the camera is changed to the cleaning mode and before the mirror unit 30 that has started the rotation from the viewing position reaches the photographing position. This enables the dust adherent to the front surface of the optical filter 13b to be sucked out into the mirror box 20 by the flow of air indicated by the arrow G in FIG. 16, so that the dust adherent to the front surface of the optical filter 13b can be efficiently removed. Therefore, the image quality of the captured image can be improved.

(2) The control circuit 71 controls the units such that the magnet (not shown) with which the rear curtain shielding blades 6 are engaged is excited after a predetermined time T has elapsed from the time in which the magnet (not shown) with which the front curtain shielding blades 5 are engaged is excited. That is, the camera is configured such that after lapse of a predetermined time T from the time when the control circuit 71 sends an instruction to open the shutter, the control circuit 71 sends an instruction to close the shutter 12. In other words, the shutter 12 is adapted to be closed before the flow of air toward the side of the shutter 12 (arrow D) reaches near the shutter 12. As mentioned above, with the construction that the rear curtain shielding blades 6 close the photographing aperture 7 before the flow of air toward the side of the shutter 12 (arrow D) reaches near the shutter 12, the dust can be prevented from adhering again to the front surface of the optical filter 13b by the flow of air toward the side of the shutter 12 (arrow D) (FIG. 18).

Note that in the above explanation, the shutter 12 includes two groups of shielding blades, i.e., the front curtain shielding blades 5 and the rear curtain shielding blades 6. However, the shutter 12 may include only one group of shielding blades. In this case, it may be configured such that the only one group of shielding blades is moved to open the shutter 12 on the way while the mirror unit 30 is being rotated from the viewing position to the photographing position and then after lapse of a predetermined time, the only one group of the shielding blades is moved to close the shutter 12.

The abovementioned embodiments and modifications may be combined with each other. Note that the present invention is not limited to the above-mentioned embodiments and encompasses digital cameras having various constructions that include a light guide section that guides a light flux from a photographic lens to an imaging unit; a mirror unit arranged inside the light guide section that is adapted to be rotated between a viewing position in which the mirror unit is inserted in a photographic light path from the photographic lens to the imaging unit to reflect the light flux and a photographing position in which the mirror unit is retracted from the photographic light path; a mirror unit control section that controls rotation of the mirror unit; a rotation instruction section that outputs a signal to rotate the mirror unit while no photography is performed to the mirror unit control section; and an opening section provided in the light guide section that discharges from the light guide section air that moves by the rotation of the mirror unit.

Note that the lid member 41 may be omitted.

The digital cameras according to the first and second embodiments of the present invention can effectively prevent dust from adhering to the imaging unit.

The above-described embodiments are examples, and various modifications can be made without departing from the scope of the present invention.

What is claimed is:

1. A digital camera, comprising:
 a light guide section that defines a space in which a light flux from a photographic lens to an imaging unit is guided;
 a mirror unit arranged inside the light guide section, that is adapted to rotate between a viewing position in which the mirror unit is inserted in a photographic light path from the photographic lens to the imaging unit to reflect the light flux and a photographing position in which the mirror unit is retracted from the photographic light path;
 a mirror unit control section that controls rotation of the mirror unit;
 a rotation instruction section that outputs a signal to rotate the mirror unit while no photography is performed to the mirror unit control section;
 an opening section provided in the light guide section that discharges from the light guide section air that is moved by the rotation of the mirror unit;
 a shutter arranged between the mirror unit and the imaging unit; and
 a shutter control section that controls opening and closing operation of the shutter,
 wherein the shutter control section controls the shutter to be changed from a state in which the shutter is closed to a state in which the shutter is opened and then again to a state in which the shutter is closed, during a time between a time before the mirror unit starts rotation from the viewing position to the photographing position and a time before the mirror unit reaches the photographing position after the mirror unit has started rotation from the viewing position to the photographing position.

2. A digital camera according to claim 1, wherein
 the photographic lens is detachable from a camera body of the digital camera, and
 the rotation instruction section outputs the signal to the mirror unit control section when the photographic lens is attached to the camera body of the digital camera.

3. A digital camera according to claim 1, wherein the rotation instruction section outputs the signal to the mirror unit control section when power of the digital camera is turned ON or turned OFF.

4. A digital camera according to claim 1, further comprising:
 an operation member that outputs a rotation command to rotate the mirror unit in response to an operation by a user, wherein
 the rotation instruction section outputs the signal to the mirror unit control section in response to the command to rotate the mirror unit, and
 the rotation instruction section outputs the signal to the mirror unit control section in response to the rotation command from the operation member.

5. A digital camera according to claim 1, wherein:
 the shutter control section controls the shutter to be changed from a state in which the shutter is closed to a state in which the shutter is opened, and thereafter controls the shutter to be changed again to a state in which the shutter is closed before a flow of air toward the imaging unit from a side of the photographic lens generated in the light guide section by rotation of the mirror unit from the viewing position to the photographing position reaches near the shutter, during a time between a time before the mirror unit starts rotation from the viewing position to the photographing position and a time before the mirror unit reaches the photographing position after the mirror unit has started rotation from the viewing position to the photographing position.

6. A digital camera according to claim 1, wherein the opening section is provided at a bottom plane among planes defining the light opening section.

7. A digital camera according to claim 1, wherein the opening section achieves a slit-like form.

8. A digital camera, comprising:
   a light guide section that defines a space in which a light flux from a photographic lens to an imaging unit is guided;
   a mirror unit arranged inside the light guide section, that is adapted to rotate between a viewing position in which the mirror unit is inserted in a photographic light path from the photographic lens to the imaging unit to reflect the light flux and a photographing position in which the mirror unit is retracted from the photographic light path;
   a shutter arranged between the mirror unit and the imaging unit;
   a shutter control section that controls opening and closing operation of the shutter;
   a vibration control section that controls vibration of an optical filter arranged between the shutter and the imaging unit or vibration of the imaging unit;
   a mirror unit control section that controls rotation of the mirror unit to cause rotation between the viewing position and the photographing position while the vibration of the optical filter or the imaging unit is operated in a state in which the shutter is opened; and
   an opening section provided in the light guide section that discharges from the light guide section air that is moved by the rotation of the mirror unit.

9. A digital camera according to claim 8, wherein after the rotation of the mirror unit is completed, the shutter is closed and the vibration of the optical filter or the imaging unit is stopped.

10. A digital camera according to claim 8, wherein after the vibration of the optical filter or the imaging unit is operated in a state in which the shutter is opened, the shutter is closed and the rotation of the mirror unit is operated.

11. A digital camera according to claim 8, wherein the mirror unit control section controls rotation of the mirror unit to cause rotation at least two times.

12. A digital camera, comprising:
   a light guide section that defines a space in which a light flux from a photographic lens to an imaging unit is guided;
   a mirror unit arranged inside the light guide section, that is adapted to rotate between a viewing position in which the mirror unit is inserted in a photographic light path from the photographic lens to the imaging unit to reflect the light flux and a photographing position in which the mirror unit is retracted from the photographic light path;
   a mirror unit control section that controls rotation of the mirror unit;
   a rotation instruction section that outputs a signal to rotate the mirror unit while no photography is performed to the mirror unit control section;
   an opening section provided in the light guide section that discharges from the light guide section air that is moved by the rotation of the mirror unit;
   a shutter arranged between the mirror unit and the imaging unit, and;
   a shutter control section that controls opening and closing operation of the shutter,
   wherein the mirror unit control section controls rotation of the mirror unit from the photographing position to the viewing position in a state in which the shutter is opened, and then controls rotation of the mirror unit from the viewing position to the photographing position in a state in which the shutter is closed.

13. A digital camera, comprising:
   a light guide section to guide a light flux from a photographic lens to an imaging unit;
   a mirror unit arranged inside the light guide section, that is adapted to rotate between a viewing position in which the mirror unit is positioned in a photographic light path from the photographic lens to the imaging unit to reflect the light flux and a photographing position in which the mirror unit is retracted from the photographic light path;
   an opening section provided in the light guide section that discharges air that is moved by the rotation of the mirror unit from the light guide section;
   a shutter arranged between the mirror unit and the imaging unit; and
   a shutter control section that controls an opening operation and a closing operation of the shutter, wherein the shutter control section controls the shutter to be changed from a state in which the shutter is closed to a state in which the shutter is opened and then again to a state in which the shutter is closed, wherein after the shutter has begun to be changed from a state in which the shutter is closed to a state in which the shutter is opened, the mirror unit starts rotation from the viewing position to the photographing position, and wherein the shutter is changed from a state in which the shutter is closed to a state in which the shutter is opened and then again to a state in which the shutter is closed before the mirror unit reaches the photographing position.

* * * * *